United States Patent
Vaidya et al.

(10) Patent No.: US 9,762,619 B1
(45) Date of Patent: Sep. 12, 2017

(54) MULTI-LAYER POLICY DEFINITION AND ENFORCEMENT FRAMEWORK FOR NETWORK VIRTUALIZATION

(71) Applicant: Nicira, Inc., Palo Alto, CA (US)

(72) Inventors: Sachin Mohan Vaidya, Pune (IN); W. Andrew Lambeth, San Mateo, CA (US); James Joseph Stabile, San Mateo, CA (US); Farzad Ghannadian, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/369,596

(22) Filed: Dec. 5, 2016

(30) Foreign Application Priority Data

Aug. 30, 2016 (IN) .............................. 201641029492

(51) Int. Cl.
  *H04L 29/06* (2006.01)
  *H04L 12/24* (2006.01)

(52) U.S. Cl.
  CPC ............ *H04L 63/20* (2013.01); *H04L 12/244* (2013.01); *H04L 63/0263* (2013.01)

(58) Field of Classification Search
  CPC .... H04L 63/20; H04L 63/0263; H04L 12/244
  See application file for complete search history.

(56) References Cited

U.S. PATENT DOCUMENTS

| | | | | |
|---|---|---|---|---|
| 8,655,307 | B1 * | 2/2014 | Walker | H04W 52/0212 455/343.5 |
| 2002/0122422 | A1 * | 9/2002 | Kenney | H04L 41/0213 370/392 |
| 2004/0117407 | A1 * | 6/2004 | Kumar | G06Q 10/10 |
| 2005/0257244 | A1 | 11/2005 | Joly et al. | |
| 2008/0301630 | A1 * | 12/2008 | Arnold | G06F 11/3604 717/110 |
| 2008/0320550 | A1 * | 12/2008 | Strassner | H04L 63/0263 726/1 |
| 2009/0055427 | A1 * | 2/2009 | Kulasingam | H04L 41/5006 |
| 2009/0187963 | A1 * | 7/2009 | Bori | G06F 21/51 726/1 |
| 2009/0228951 | A1 * | 9/2009 | Ramesh | H04L 63/0218 726/1 |

(Continued)

FOREIGN PATENT DOCUMENTS

WO 2017/023172 6/2017

OTHER PUBLICATIONS

Flegkas, Paris et al., "On Policy-Based Extensible Hierarchical Network Management in QoS-Enabled IP Networks", POLICY2001, LNCS 1995, pp. 230-246.*

*Primary Examiner* — Michael Pyzocha
(74) *Attorney, Agent, or Firm* — Adeli LLP

(57) ABSTRACT

A multi-layer policy framework for monitoring and enforcing policy is provided. The multi-layer policy framework receives the desired state of the policy at each layer and translates the desired state into a realized state for the layer. The desired state specifies the intent of the user and the realized specifies the specific actions that have to be performed in order to reach the desired state. The realized state at each layer is sent to the next lower layer as the desired state for the lower layer. At the lowest layer, the desired state is converted into a realized state that includes a set of rules used to enforce the policy. The set of rules are then enforced at different enforcement points at the lowest layer.

18 Claims, 18 Drawing Sheets

(56) References Cited

U.S. PATENT DOCUMENTS

| | | | |
|---|---|---|---|
| 2013/0018994 A1 | 1/2013 | Flavel et al. | |
| 2013/0219176 A1* | 8/2013 | Akella | H04L 63/0815 |
| | | | 713/165 |
| 2014/0020045 A1* | 1/2014 | Kabat | G06F 21/60 |
| | | | 726/1 |
| 2014/0067779 A1* | 3/2014 | Ojha | G06F 17/30144 |
| | | | 707/694 |
| 2015/0269383 A1* | 9/2015 | Lang | G06F 21/57 |
| | | | 726/1 |
| 2016/0212167 A1* | 7/2016 | Dotan | H04L 63/20 |
| 2016/0294923 A1* | 10/2016 | Fan | H04L 47/762 |
| 2017/0093664 A1* | 3/2017 | Lynam | H04L 43/06 |

* cited by examiner

MULTI-LAYER POLICY DEFINITION AND ENFORCEMENT FRAMEWORK FOR NETWORK VIRTUALIZATION

BACKGROUND

A policy is a written declaration of intent that combines rules and services that define the criteria for resource access and usage. Request for comments (RFC) 2753 defines policy as "the combination of rules and services where rules define the criteria for resource access and usage." A policy definition includes intent related but not limited to compute, network, security and storage.

Policies are used as a tool for managing complex environments with many resources, such as a software-defined datacenter (SDDC). User's requirements, intentions, and rules are captured in a set of policies. The policies are then used to drive automated processes that enact and enforce the intent of the user. This removes manual human intervention and guarantees the user intent is maintained.

An SDDC enables management of cloud resources such as servers, networks, and storage by enabling programmatic control of those resources. Cloud users want to impose restrictions to ensure the cloud to behave in a desired way. Policies define different restrictions that the cloud must obey. Because automation is central to the operation of the SDDC, policy-based management is critical to the realization of the SDDC.

BRIEF SUMMARY

Some embodiments provide a policy model for a network virtualization platform that enables a user to specify networking and security requirements of workloads or applications in an easy to consume interface. Some embodiments utilize a set of representational state transfer (REST or RESTful) application programming interfaces to receive policy definitions and create a policy template. Each REST API identifies a resource or a service by a unique identifier and indicates what actions have to be performed on the identified resource or service. In addition, some embodiments provide a user interface to define policy by specifying networking and security requirements in a human-readable data serialization language such as YAML or Datalog.

A policy template allows the policy to be written in a template form such that multiple instances of the policy can be created to bind to different entities. The policy template is a construct that allows definition of the intent in the form of groups, networks, rules, etc., without binding it to a specific instance.

The template allows the user to specify variables that need to be populated during the instantiation of the template. Instantiation of the template is the process of deploying the template with all variables populated with user-entered values, thus creating a policy instance. A policy instance is the entity that directly manages different enforcement engines such as distributed firewall, load balancer, etc.

The policy template in some embodiments includes a set of variables, a set of resources, and a set of actions. The variables are named fields that need to be populated during instantiation. A variable serves as a placeholder that can be used in defining resources and actions, and is replaced by a value provided during instantiation. Resources identify entities that are referred to in the actions. Resources can be entities that (i) already exist or (ii) entities that do not exist and are created during instantiation of the policy. In other words, some embodiments allow the policies to be defined in terms of resources that do not exist. For instance, a resource (such as a virtual machine (VM), a logical switch, a logical port, a security group, a user group, etc.) that is specified in a policy and does not exist when the policy is defined is automatically created as a part of the policy instantiation.

Actions describe the actual tasks and functions that need to be performed when a policy template is instantiated. Actions supported for each enforcement point are registered by the enforcement point provider at startup. Typically, actions refer to entities declared in the resources section of the policy template.

The providers register capabilities with the policy framework. The capabilities are actions, which the providers provide and configurations the providers require for enforcing the actions. The plug-in capability allows new providers to be added without any change to other enforcement engines in the policy framework. In other words, the policy framework allows providers to provide new services and plug them as enforcement engines into the framework. The enforcement provider framework allows different modules to get plugged into the policy framework.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
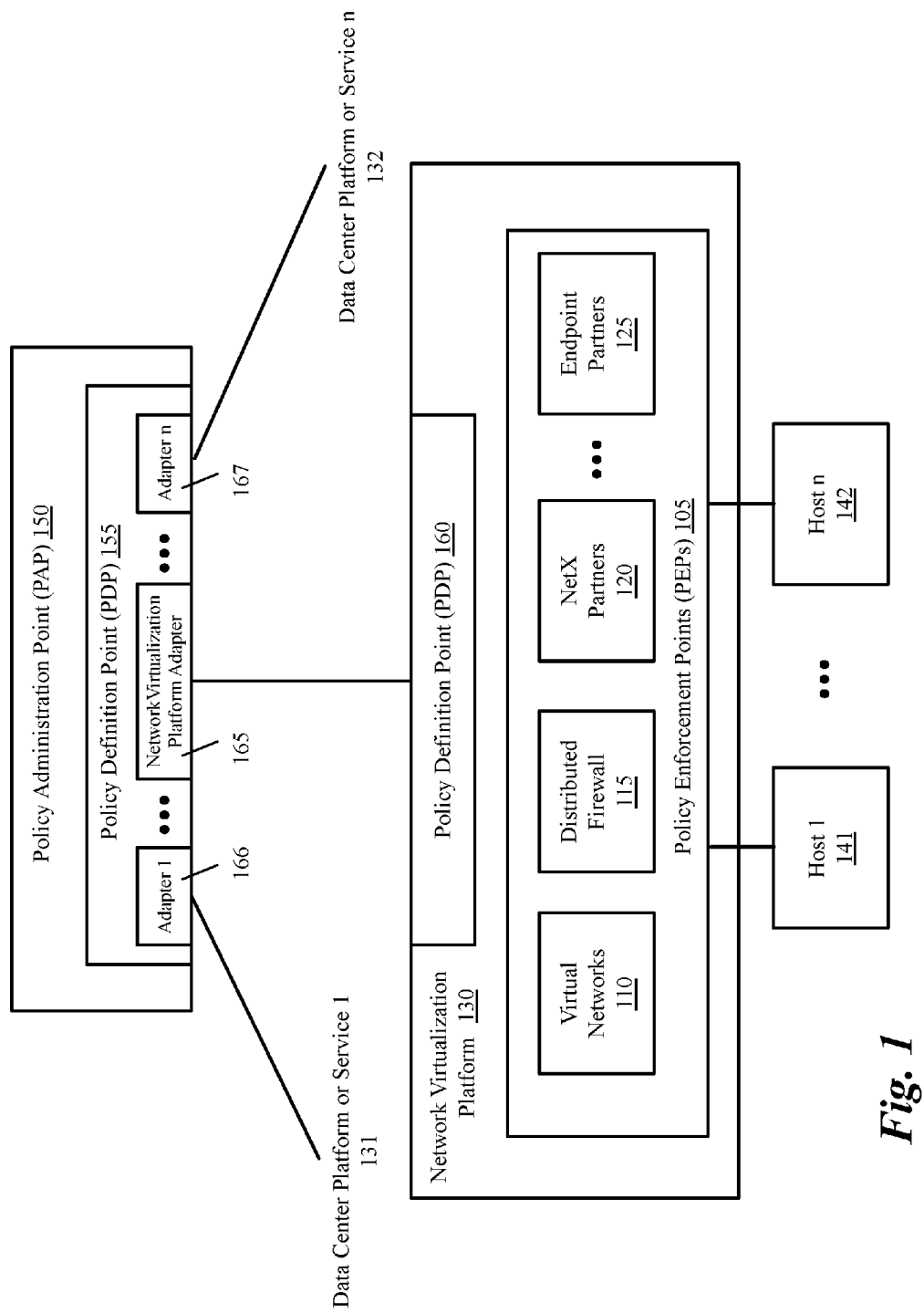
FIG. 1 conceptually illustrates a framework for acceptance and enforcement of policies in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

A policy definition includes the intent but does not specify details of enforcement mechanics. Some embodiments provide a method that enables a network virtualization platform to be consumed as a policy enforcement endpoint. The network virtualization platform (or network manager) is a virtualized server that is installed on one or more physical servers and is used to define and/or manage the networking resources of a datacenter.

The policy is specified in a template form, which allows multiple instances of the policy to be created and bind to different entities during instantiation. The policy template itself allows definition of the intent in the form of groups, networks, rules, etc., without binding the definitions to specific instances.

The template allows the user to specify variables that need to be populated during the instantiation of the template. Instantiation of the template is the process of deploying the template with all variables populated with user-entered values, thus creating a policy instance. A policy instance is the entity that directly manages different enforcement engines such as distributed firewall, load balancer, etc.

The method also describes constructs provided by the network virtualization platform to support a high-level policy framework that encompasses elements that are not native to the network virtualization platform. Third party providers register their capabilities with the policy framework. The capabilities are actions, which the providers provide and configurations the providers require for enforcing the actions. The policy framework allows providers to provide new services and plug them as enforcement engines into the framework.

I. Generation of Policy Templates and Instances

A policy is a written declaration of intent that includes but not limited to compute, network, security and storage. Some embodiments provide a policy model for network virtualization platform that enables a user to specify networking and security requirements of workloads or applications in an easy to consume interface. Some embodiments utilize a set of representational state transfer (REST or RESTful) application programming interfaces (APIs) to receive policy definitions. Each REST API identifies a resource or a service by a unique identifier and indicates what action has to be performed on the identified resource or service by using a set of verbs such as GET, PUT, DELETE, etc.

In addition, some embodiments provide a user interface (UI) to define policy by specifying networking and security requirements in a human-readable data serialization language such as YAML. The UI in other embodiments supports Datalog for defining policy.

FIG. 1 conceptually illustrates a policy framework for acceptance and enforcement of policies in some embodiments. The framework is utilized to accept policy from a user (as a desired state) and enforce the policy using the engines and services supported by the network virtualization platform (as a realization of the desired state). The framework accepts a declarative policy input, which is realized by the system without requiring the user to understand or specify the mechanics of realization.

A policy administration point (PAP) 150 is an interface or tool that provides centralized administration, management and monitoring of policies. PAP provides APIs and UIs for receiving policy definitions, receiving policy modifications, and monitoring of policies. PAP provides a high level interface for a user to define the policy and consume different resources and services using high level abstractions instead of using individual APIs to define an individual policy for each of the services 110-125. PAP also provides status reports to the user.

A policy decision point (PDP) 155-160 is a logical entity that makes policy decisions for itself or for other network elements that request such decisions. A policy enforcement point (PEP) is a logical entity that enforces decisions provided by PDP. The PEPs 105, in some embodiments, reside in enforcement solutions 110-125 of the network virtualization platform 130. The network virtualization platform 130 provides services for creating virtual networks, distributed firewall, traffic redirection, guest introspection, etc. In addition, the network virtualization platform uses services provided by third party providers (i.e., services that are not native to and not deployed as a part of the network virtualization platform) as plugins. Each one of these native or non-native services can be used as an enforcement solution 110-125.

The PEPs are utilized in the data center to perform the actual enforcement of the policies. As shown, examples of the PEPs include virtual networks 110, distributed firewall 115, Network Extensibility (NetX) partners 120, and endpoint partners 125. NetX is a set of APIs that is integrated into packet forwarding elements to provide third party partner access to network data flows. The APIs allows third party partners to insert their solutions in front of VMs or at the edge of a datacenter. Several other examples of PEPs are provided further below.

While NetX partners work on the traffic redirected to their appliances, the endpoint (or Guest Introspection (GI)) partners work on the guest (i.e., SDDC tenant) file and network events. Examples of NetX partners are intrusion detection/intrusion prevention systems (IDS/IPS), while the example of an endpoint partner is an anti-virus solution. A GI is an endpoint entity that runs within a guest VM.

Each one of enforcement solutions 110-125 is an enforcement engine, which accepts configuration specific to an individual policy area and applies it to the infrastructure thus transforming the configuration into runtime state. For instance, distributed firewall (DFW) 115 is an enforcement engine that provides firewall capabilities. DFW receives firewall rules and enforces the rules to packet traffic. Each of the enforcement solutions 110-125 typically includes a controller and an agent. The controller receives requests for service as well as the identification of a set of actions to be performed on a set of resources. The agent resides in the host where the rules are enforced and uses different functions provided by the host in order to enforce the rules. For instance, the DFW includes a controller that receives requests to allow or deny forwarding of packets from a source or a destination. The DFW also includes an agent (not shown) in each host 141-142 that receives specific firewall rules and enforces the rules using different functions provided by the host (e.g., uses function calls at a port of a forwarding element in the host) in order to apply firewall rules to the incoming packet traffic.

As conceptually shown in FIG. 1, PDP 155-160 spans (i) across different enforcement solutions 110-125 (as shown by 160) and (ii) across PAP 150 (as shown by 155). The policy authored at the PAP 150 in some embodiments is handed over to PDP 160 for authorization and further breakdown. In other embodiments, the authored policy is authorized at the PAP. The PDP in some embodiments includes an adapter 165 for network virtualization platform, which breaks down and translates the higher-level policy from PAP into a definition that is specific to the network virtualization platform 130. The PDP in some embodiments also includes other adapters 166-167 for network virtualization platform, which breaks down and translates the higher-level policy from PAP into a definition that is specific to other platforms and solutions 131-132 in the data center. The PDP counterpart 160 in the network virtualization platform 130 further authorizes the policy definition received from the adapter and instantiates it.

The PAP, which owns the policy definition, in some embodiments resides in cloud management platforms (CMPs). This is because the policy definition is not limited to networking and security concepts but also encompasses other aspects of resource usage that are beyond the capabilities of a single enforcement solution such as the network virtualization platform 130.

In other embodiments, the policy only spans networking and security functions. In these embodiments, having a construct in the network virtualization platform to represent the policy would allow the user to consume the functions without depending on an external solution to provide the abstraction. In some embodiments, the policy construct in the network virtualization platform is built in a manner that allows an external PAP to easily integrate with it. For instance, policy constructs used by network virtualization platform are translated into policy constructs used by the external solution and vice versa.

The network virtualization platform policy model provides networking and security services to consumers without requiring the consumer to deal with (e.g., to query) each service individually. In other words, the PAP in the network virtualization platform provides administration for network virtualization platform policies.

CMPs in some embodiments are one of the consumption interfaces for the network virtualization policy model. Administrators for enterprise networking and security are other consumers of the network virtualization platform policy. The CMPs provide tools for management of private and public clouds. In some embodiments, the network virtualization policy model is used to apply policies to workloads that are provisioned through the cloud. The policy model is also utilized on private clouds where policies are created and associated with each tenant thus providing a single container for all the workloads and the networking and security controls put together.

To provide maximum flexibility to cloud consumers and external workflows, the policy model in some embodiments is built in a manner that allows inline injection and execution of tasks that belong to the consumers. For instance, some embodiments allow users to write custom made services (e.g., as scripts) that are applicable to the user's specific application. The user can then register the custom made service as one of the PEPs 105. In other words, the network virtualization platform, third party providers, and the users can all act as service providers and register one or more services as one of the PEPs 105.

A. Management Plane

A typical network includes three planes or areas of operation. The data plane carries the user traffic, the control plane carries the signaling traffic, and the management plane is used to interact with the user or administrator of the network.

The management plane in some embodiments accepts the policy intent from the user and stores it to the desired state. The desired state, once accepted, is not modified by the system. The realization of the desired state is performed via a series of translations, which are described further below.

i. Policy Templates

A policy template allows the policy to be written in a template form such that multiple instances of the policy can be created to bind to different existing entities. The policy template is a construct that allows definition of the intent in the form of groups, networks, rules, etc., without binding it to a specific instance.

The policy template allows the user to specify variables that need to be populated during the instantiation of the template. Instantiation of the template is the process of deploying the template with all variables populated with user-defined values, thus creating a policy instance. Each policy instance is an entity that directly manages different enforcement engines such as distributed firewall, load balancer, etc.

Figure 2:
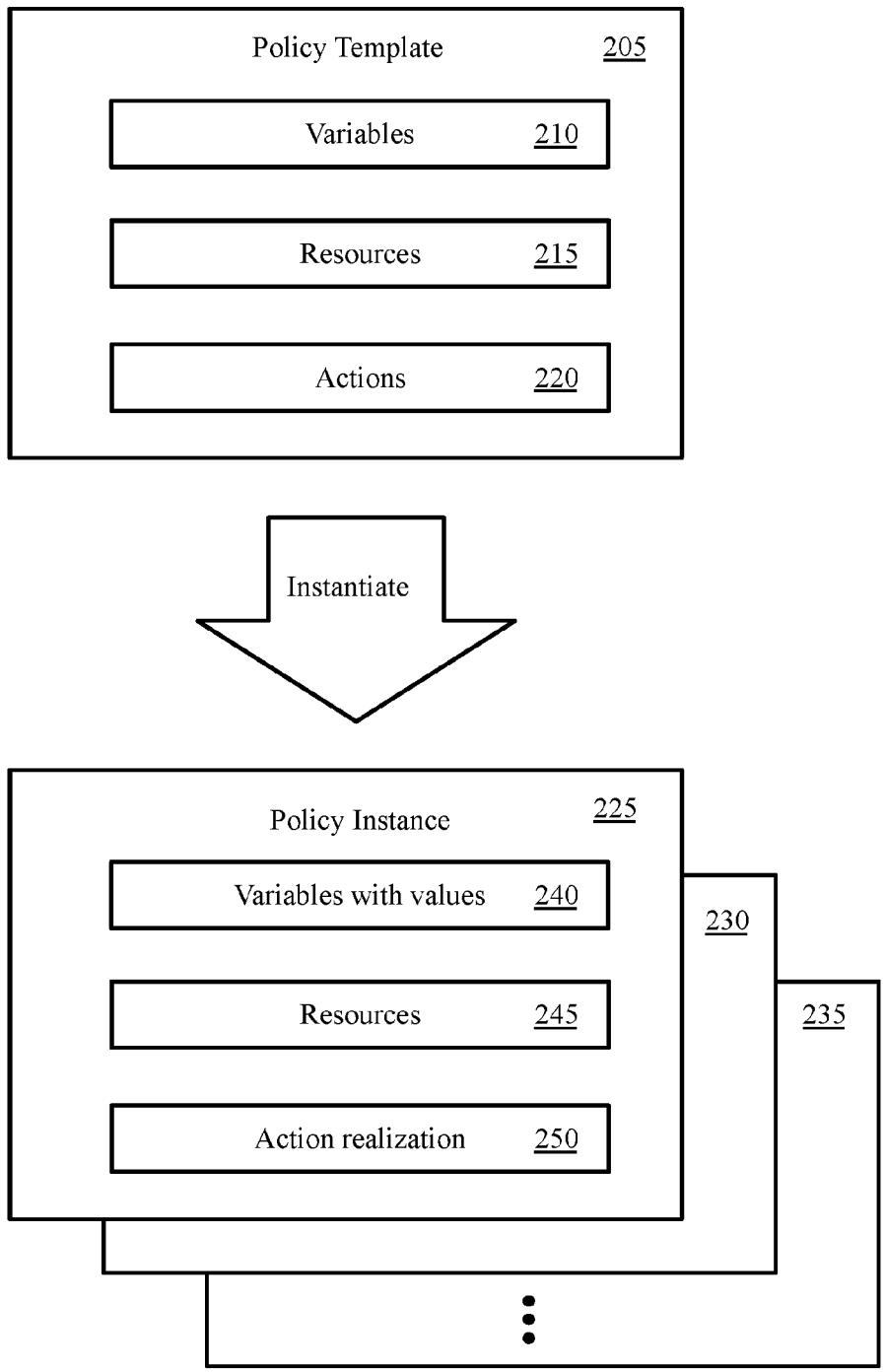
FIG. 2 conceptually illustrates a policy template and several policy instances that are instantiated from the template in some embodiments.

FIG. 2 conceptually illustrates a policy template and several policy instances that are instantiated from the template in some embodiments. The policy template 205 is a structure that in some embodiments is divided in three sections: variables 210, resources 215, and actions 220. The template allows a data center's resources to bind with different services through actions that are provided (or registered) by the service providers.

Variables are named fields that need to be populated by the user defined values during instantiation. A variable serves as a placeholder that can be used in the resources and actions sections, and is replaced by a value provided during instantiation. Resources identify entities that are referred to in the actions. Resources are data center entities that either (i) already exist or (ii) do not exist when they are defined in the policy template and are created during instantiation of the policy. In other words, some embodiments allow policies to be defined in terms of resources that do not exist. A resource (such as a VM, a logical switch, a logical port, a security group, a user group, etc.) that is specified in a policy and does not exist when the policy is defined is automatically created as a part of policy instantiation.

Actions describe the actual tasks and functions that are performed after a policy template is instantiated. Actions supported for each enforcement point are registered by the enforcement point provider at startup prior to being used in a policy template. Typically, actions refer to entities declared in the resources section 215. For instance, a firewall "allow" action could refer to groups that are declared in the resources section 215. Each group is a construct that allows collecting different elements together in order for the rules to be applied to the collection instead of individual elements. Groups in some embodiments are constructs that are formed by grouping one or more entities such as virtual network cards (VNICs), VMs, hosts, compute constructs and/or network constructs. In some embodiments, the policy is associated with one or more expressions, each of which can be represented by a group. Each rule within the policy can be associated with one or more groups. The groups can be specified by users (e.g., network administrators) in some embodiments. Conjunctively, or alternatively, the groups can be specified by automated process in some embodiments.

An entity that has to be created via an action (e.g., action 1) that belongs to one provider can be referred to by an action that belong to another provider (e.g., action 2) by using a resource that is used both action 1 and action 2. Some embodiments provide a built-in action that allows instantiation of a template from the actions section 220 of a different parent template. This built-in action allows different enforcements to provide built-in (or canned) templates. The policy template 205 allows the policy to be defined as a data transfer object (DTO) in order to carry data between processes performing PAP, PDP, and PEP.

As shown in the example of FIG. 2, policy template 205 is instantiated into several policy instances 225-235. Each instance also includes three sections 240-250. Each variable in the variables section 240 in each instance 225-235 includes a corresponding value. Resources in the resource section 245 identify entities to which the actions are applied. If a resource identified in the template 205 does not exist at the time of instantiation, the resource is created as a part of instantiation. For instance, if a VM that does not exist is specified as a resource in template 205, the VM is created (e.g., using a create call) at the time of instantiation. Actions in the action section 250 are realization of the desired states specified in the template.

In some embodiments, a policy can be written in a way that allows each policy instance to be managed by a separate tenant. For instance, the resources can be tagged or named by using a variable for template identification that is defined in the same template. The higher-level cloud management solution then makes use of this facility to manage resources belonging to each tenant.

Figure 3:
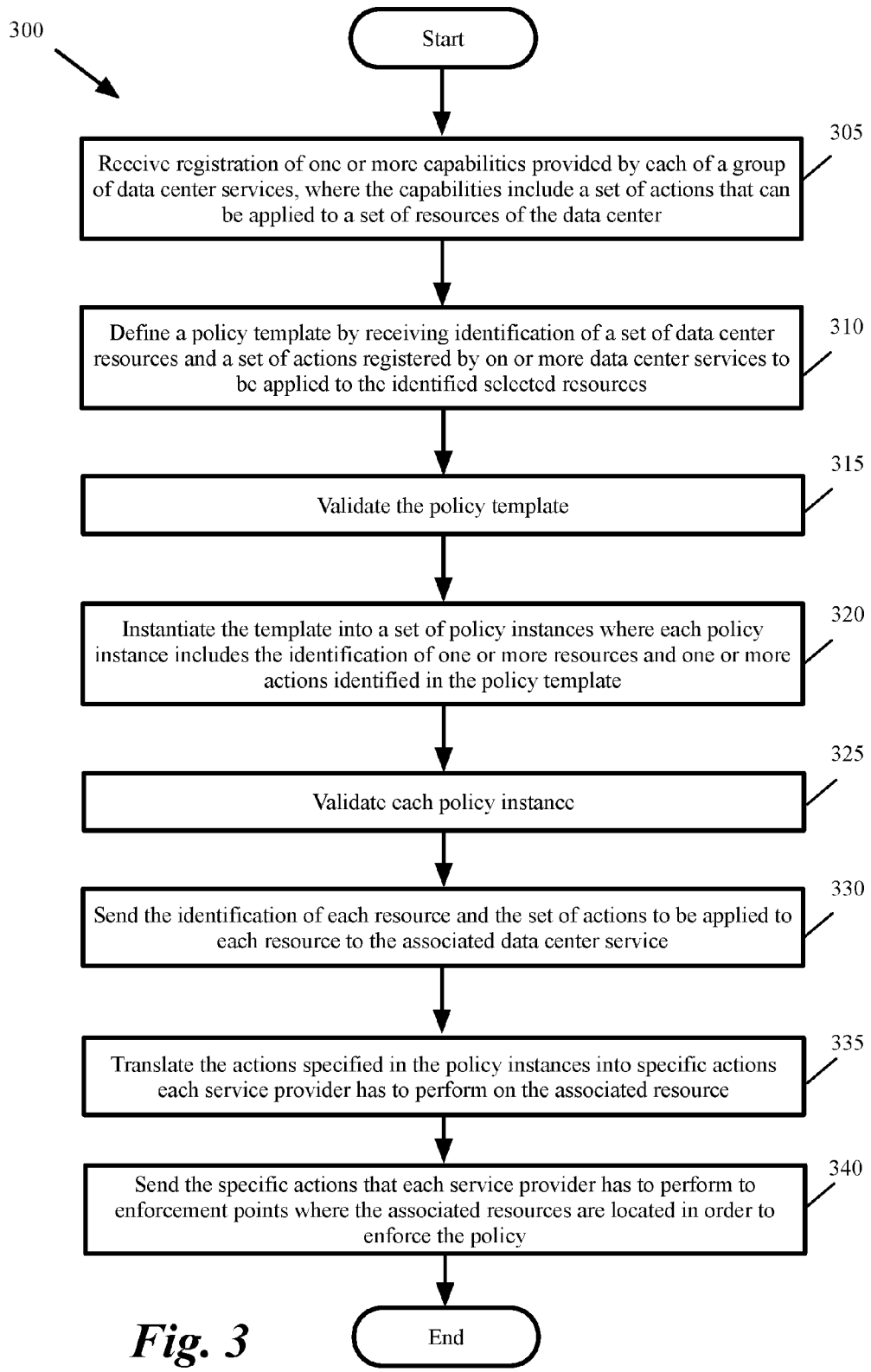
FIG. 3 conceptually illustrates a process for defining, instantiating, and enforcing policy in some embodiments.

FIG. 3 conceptually illustrates a process 300 for defining, instantiating, and enforcing policies in some embodiments. The process in some embodiments is performed by a PAP such as PAP 150 in FIG. 1. As shown, the process receives (at 305) registration of one or more capabilities provided by each of a group of data center services. For instance, services such as network virtualization platform native services, services provided by vendors and third party service providers, and custom made user-created services register the actions their services provide, the resources that the actions are applied to, and the configurations their services require in order to enforce the actions.

For example, a networking service provider registers an action such as "createSwitch." The networking provider also registers a logical switch (or forwarding element) as a resource that the action can be applied. The networking provider also registers any configuration required in order to create the logical switch. As another example, a firewall service provider registers actions such as allow and deny. The firewall service provider also registers the resources such as a packet (or the packet's source and destination information identified in the packet header) as the resource(s) to which the allow and deny actions are to be applied.

The resource registered by a service provider may be a common resource of the data center (such as a virtual machine or a switch) or the resource may be a resource that is unique to the service provider and is introduced as a new data center resource that could be used in policy definition when the resource is registered by the service provider. The registration of service provider capabilities occur at the system start up or when a new service become available. The registration of a service capabilities is done prior to a user being able to use the service capabilities in defining a policy.

The process then defines (at 310) a policy template by receiving (i) the identification of a set of data center resources and (ii) the identification a set of actions registered by a set of data center services to be applied to the selected resources. For instance, PAP 150 in FIG. 1 receives the identification of the resources and actions through a UI or an API. The policy template includes the definition of one or more variables, where each variable defines an attribute of an action to be applied to a resource identified in the policy. The user can define policy for several different services provided by different service provide by defining one policy template (As opposed to consume the services of each individual provider by an API provided by the individual provider). The policy template describes the intent of the user without describing how a particular intent is going to be implemented. The process then optionally validates (at 315) the policy template. Details of policy template validation are provided further below.

The process then instantiates (at 320) the template into one or more policy instants. Each policy instance in some embodiments includes the identification of one or more actions and one or more resources defined in the policy template. During the instantiation of each policy instance, the process provides a value for each variable defined in the policy template.

For example, for each policy instance, the process uses an environment profile and populates variables used in the policy template for defining resources and actions with specific values. The environment profile includes a set of attribute values specific to the particular environment where the policy is instantiated.

The process then optionally validates (at 325) each policy instance. Details of policy instance validation are provided further below. The process, for each policy instance, sends (at 330) the identification of each resource and the set of actions to be applied to each resource to the associated data center service. For instance, for a particular policy instance that identifies a logical switch and a high-level createSwitch action to create the logical switch, the identification of the logical switch and the "createSwitch" action are sent to the networking service that provides the action. In addition, if the logical switch does not exist at the time of instantiation of the policy instance, the logical switch is created based on the information provided in the policy template.

The process then translates (at 335) the high-level actions (or desired states) specified in policy instances into specific actions (or the realized state) that the service provider has to perform on the associated resources. For instance, a firewall controller receives the high-level allow and deny actions and the associated resources and translates the actions into specific actions that are required to implement the firewall rules. The process then sends (340) the specific actions that each service provider has to perform to the enforcement points where the associated resource are located in order for the actions specified in the policy to be enforced. For instance, the firewall controller sends the firewall rules to the virtualization software (e.g., the hypervisor) of a host where packets are received at a port of a logical switch in order to enforce the firewall rules. The process then ends.

ii. Input Language

Some embodiments provide REST APIs that are invoked programmatically by higher level compute managers, cloud portals, graphical user interfaces, or scripts. The APIs in some embodiments use JavaScript Object Notation (JSON) based input that makes it convenient for programs to consume (or utilize) the network virtualization platform policy. As described above, the policy is defined in the form of a DTO.

In addition, some embodiments provide a language for direct authoring and modification by humans. For instance, some embodiments utilize YAML, which is a human-readable data serialization language. Other embodiments utilize other languages such as Datalog to define the policy. Some embodiments allow visualizations and icons associated with each provider to facilitate policy definition. In some embodiments, a user can drag and drop different icons to define policies on a UI canvas. The user can also use languages such as YAML and Datalog to define the policy. Once the user-defined policy is completed, the policy is translated into the DTO language and goes through the same life cycle as the policies defined through REST APIs. In some embodiments, entities defined through an API as a policy resource cannot be deleted by a user through the UI.

iii. Input Validation

Figure 4:
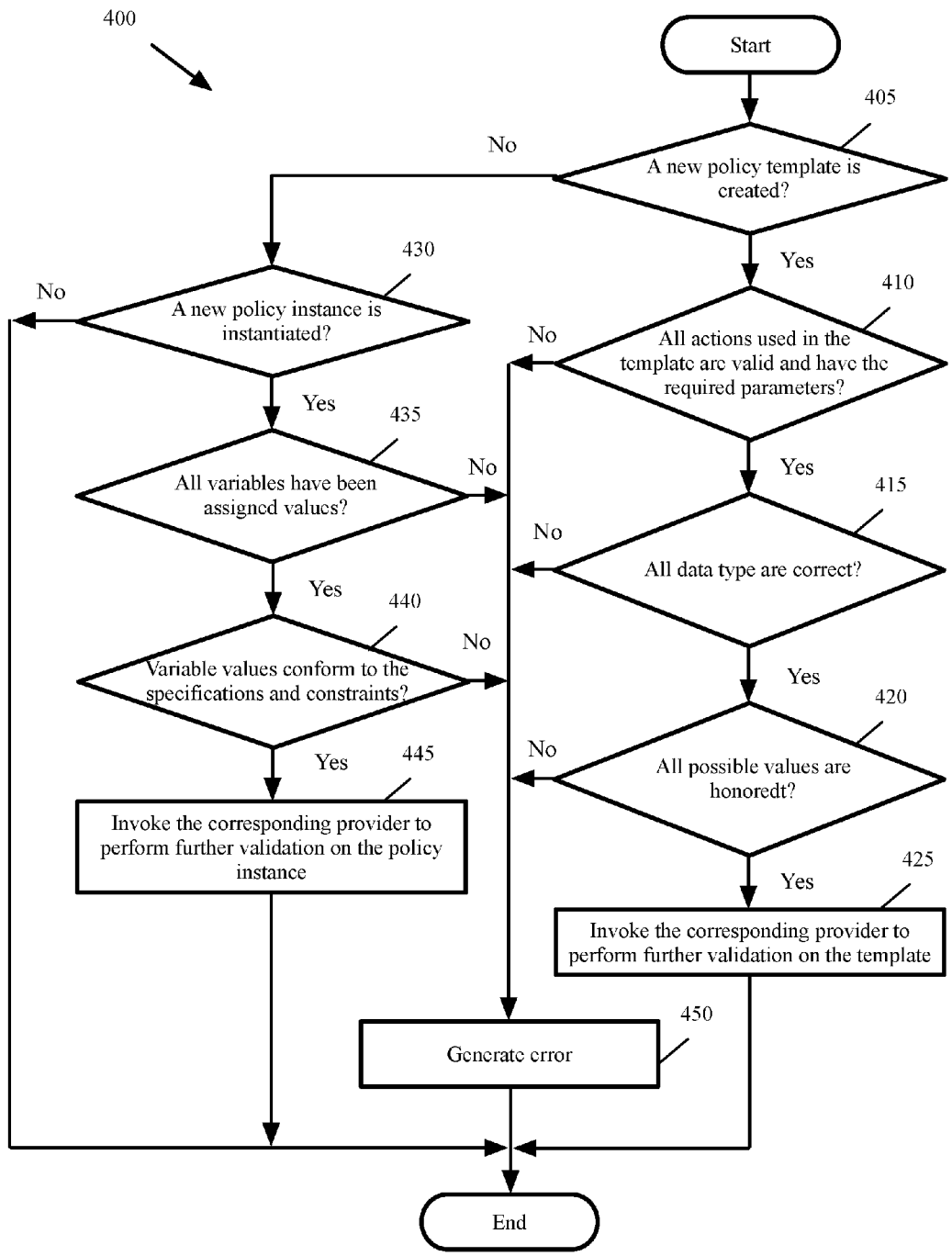
FIG. 4 conceptually illustrates a process for policy validation by the network virtualization platform in some embodiments.

Input validation in some embodiments is done in two phases. First the framework performs validation based on the specifications and constraints that the platform knows via the provider registration. The framework further invokes the providers for detailed validation. FIG. 4 conceptually illustrates a process 400 for policy validation by the network virtualization platform in some embodiments. The process in some embodiments is performed at a policy administration point such as PAP 150 or a policy definition point such as PDP 155-160 in FIG. 1.

As shown, the process determines (at 405) whether a new policy template is created. If not, the process proceeds to 430, which is described below. Otherwise, the process determines (at 410) whether all actions used in the template are valid and have the required parameters. If not, the process generates (at 450) an error. For simplicity all error reports are shown by reference to operation 450. It should be understood that different error conditions generate different error messages. The process then ends.

Otherwise, the process determines (at 415) whether all data types are correct. If not, the process proceeds to 450, which was described above. Otherwise, the process determines (at 420) whether all possible values in the template are honored. If not, the process proceeds to 450, which was described above. Otherwise, the process invokes (at 425) the corresponding provider to perform further validations on the template. For instance, the process calls a validate function registered by a service provider to further validate the template. The process then ends. Validations performed by the service providers are described below by reference to FIG. 5.

At 430, the process determines whether a new policy instance is instantiated. If not, the process ends. Otherwise, the process determines (at 435) whether all variables have been assigned values. If not, the process proceeds to 450, which was described above. Otherwise, the process determines (at 440) whether variable values conform to the corresponding specifications and constraints. If not, the process proceeds to 450, which was described above. Otherwise, the process invokes (at 445) the corresponding provider to perform further validations on the policy instance. The process then ends.

Figure 5:
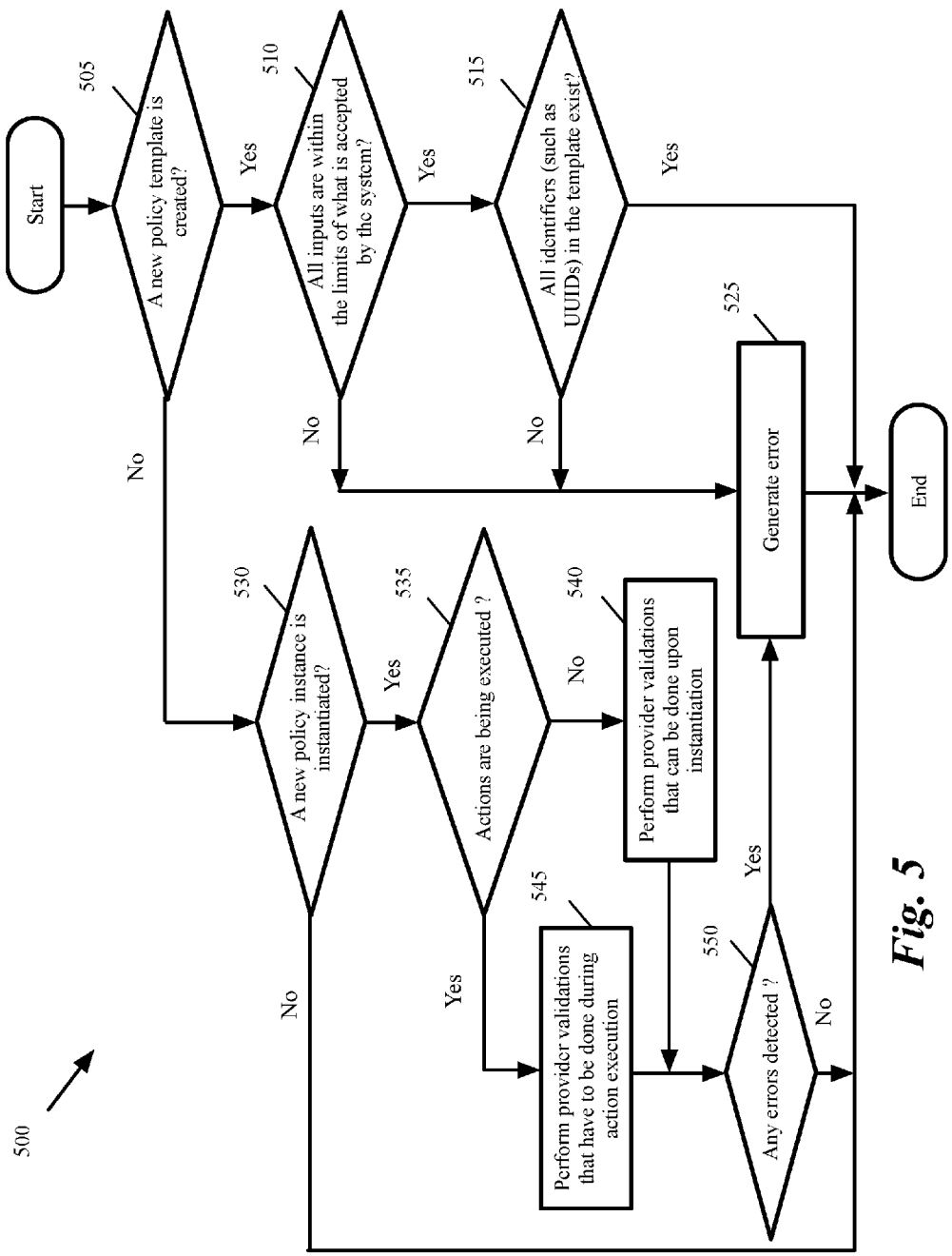
FIG. 5 conceptually illustrates a process for policy validation by a service provider in some embodiments.

FIG. 5 conceptually illustrates a process 500 for policy validation by a service provider in some embodiments. The process in some embodiments is performed by a service provider at a policy enforcement point such as PEPs 110-125. Process 500 in some embodiments is invoked by operations 425 or 445 of process 400 in FIG. 4.

As shown, the process determines (at 505) whether a new policy template is created. If not, the process proceeds to 530, which is described below. Otherwise, the process determines (at 510) whether all inputs are within the limits of what is accepted by the system. For example, the process determines whether each input is within a range of predetermined values. If not, the process generates (at 525) an error. The process then ends. For simplicity all error reports are shown by reference to operation 525. It should be understood that different error conditions generate different error messages.

Otherwise, the process determines (at 515) whether all identifiers, such as universally unique identifiers (UUIDs), that are hard coded in the template exist. If not, the process proceeds to 525, which was described above. Otherwise, the process ends.

At 530, the process determines whether a new policy instance is instantiated. If not, the process ends. Otherwise, the process determines (at 535) whether actions are being executed. The provider validations, in some embodiments, are performed in two stages. The first stage is on invocation of a validate function upon instantiation of a policy instance by the framework. The second stage is performed during the execution of actions. The two-stage validation is needed, as some validations cannot be performed unless earlier providers have executed their actions. For instance the use of a policy-created resource such as a forwarding element (or logical switch) in a load balancer may require that the logical switch to be created as a resource referred to in a distributed firewall rule.

If the actions are not being executed (i.e., the first stage validation of the instance is being performed), the process performs (at 540) provider validations that can be done during instantiation. The process then proceeds to 550, which is described below. Otherwise, the process performs (at 545) provider validations that have to be done during the action execution. The process then determines (at 550) whether any error is detected. If yes, the process proceeds to 625, which was described above. Otherwise the process ends.

iv. Policy Instance Precedence

Each policy instance is assigned a unique precedence number in some embodiments. The precedence number is used to order the rules and manage conflicts across policies. For instance, a firewall section belonging to a policy instance with a higher precedence is placed above the section that belongs to a policy instance with lower precedence. Similarly, in each section, firewall rules belonging to a policy instance with a higher precedence are placed above the firewall rules belonging to a policy instance with a lower precedence. The use of precedence allows a user to define the policy by using a declarative language and define the desired state in any order and let the system to translate it to a realized state based on the precedence.

v. Movement of Workloads Between Different Data Centers or Cloud Services

Some embodiments allow movement of workloads (e.g., VMs) from a one host to another host. The new host may not be in the same data center. In addition, the new host may be in a data center provided by a different vendor. For instant, a tenant may move a VM from a host in a data center of a cloud service provided by a vendor to a data center of a cloud service provided by another vendor. In some situations, the new data center (or cloud service) may not support some of the services or actions specified in the policy. For instance, the new cloud service may have a different firewall service, which does not support the actions specified in the policy.

In some embodiments, when a service specified in the policy cannot be supported for a VM in a cloud service, the VM is prevented to move to a host provided by that cloud service. Other embodiments provide a user configurable option to allow the movement of the VM to a host provided by a cloud service even when one or more services specified in the policy are not supported by the cloud service. In these embodiments, the move is allowed and the VM is flagged to indicate that the VM is not protected by one or more services specified in the policy.

Figure 6:
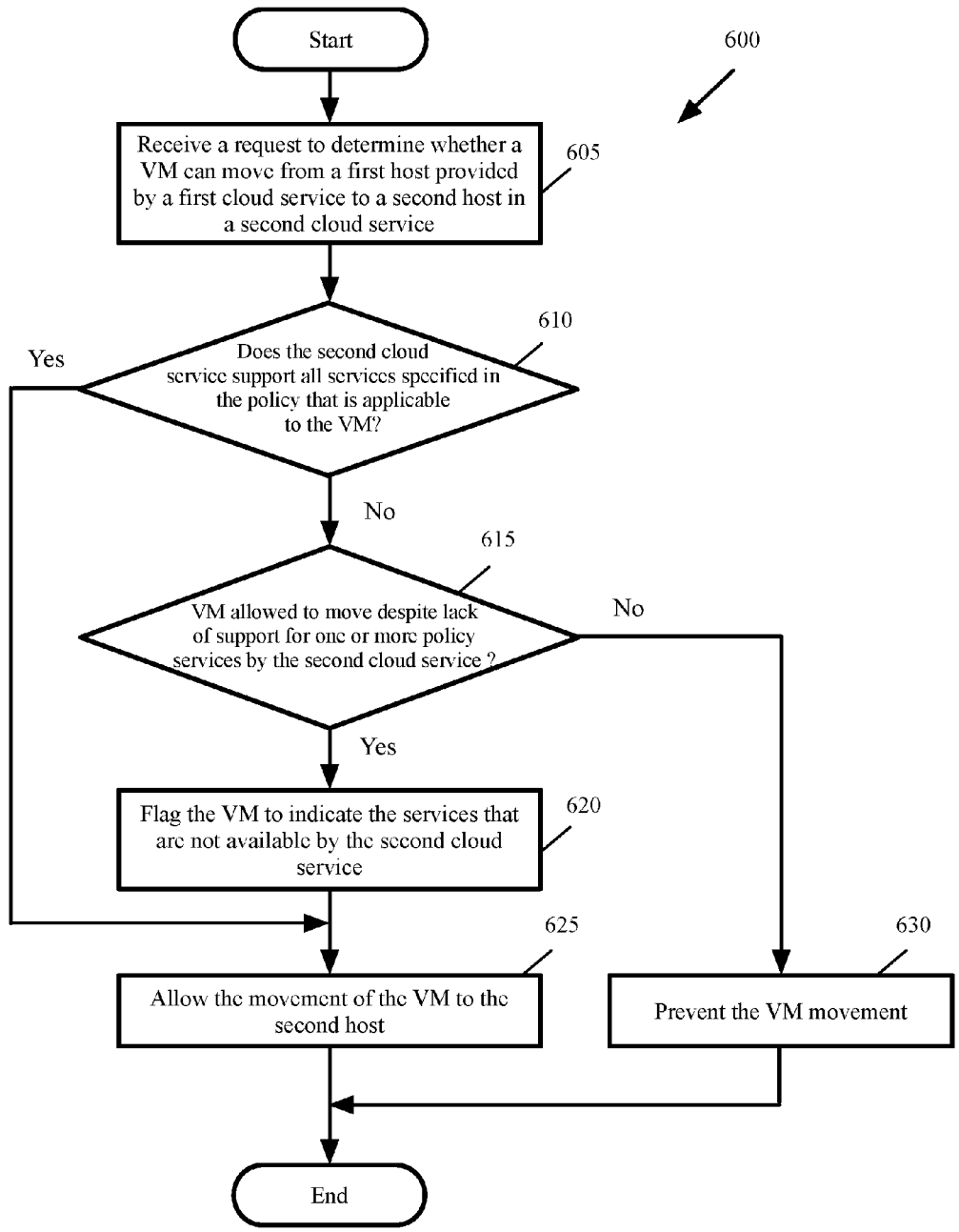
FIG. 6 conceptually illustrates a process for determining whether services specified for a VM in the policy are supported when the VM is moved from a host provided by a first cloud service to a host provided by a second cloud service.

FIG. 6 conceptually illustrates a process 600 for determining whether services specified for a VM in the policy are supported when the VM is moved from a host provided by a first cloud service to a host provided by a second cloud service. The process in some embodiment is performed by the policy framework of a data center (e.g., by the policy framework of a data center provided by the first cloud service or by the policy framework of a data center provided by the second cloud service).

As shown, the process receives (605) a request to determine whether a VM can move from a first host in a data center provided by a first cloud service to a second host in a data center provided by a second cloud service. For instance, the policy framework management plane of the first data center sends a request to the policy framework to determine whether all service specified in the VM policy are supported by the second cloud service.

The process then determines (at 610) whether the second cloud service supports all services specified in the policy that is applicable to the VM. If yes, the process proceeds to 625, which is described below. Otherwise, the process determines (at 615) whether the VM is allowed to move despite the lack of support for one or more services by the second cloud service. For instance, the process determines whether the user has set an option to allow VM movements despite the lack of support for one or more services (or the lack of support for some specific services that the user considers as non-critical) specified in the policy. If not, the process prevents (at 630) the VM movement. For instance, the process sets a flag to indicate the VM cannot move to the second host and returns the flag to the management plane of the first data center. The process then ends.

Otherwise, the process flags (at 620) the VM to indicate one or more services specified in the policy will not be available after the VM is moved to the second host. In some embodiments, the process sets a code that indicates which specific policy services will not be available after the VM moves to the second host. The process then allows (at 625) the movement of the VM to the second host. For instance, the process sets a flag to indicate the VM can move to the second host and returns the flag to the management plane of the first data center. The process then ends.

B. Enforcement Provider Framework

The policy framework in some embodiments supports new enforcement engines without requiring changes to the base framework. In other words, the policy framework allows providers to provide new services and plug them as enforcement engines into the framework. The enforcement provider framework allows different modules to get plugged into the policy framework.

Figure 7:
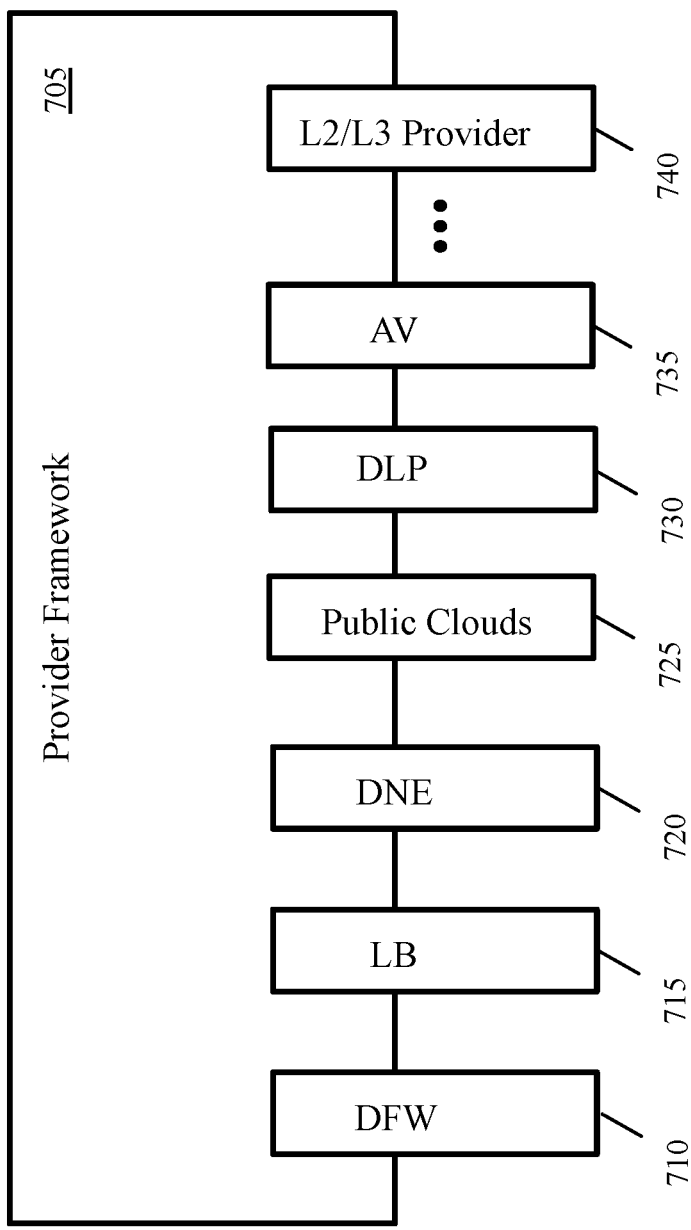
FIG. 7 conceptually illustrates a provider framework in some embodiments.

FIG. 7 conceptually illustrates a provider framework in some embodiments. As shown, the provider framework 705 allows services from one or more providers for the enforcement engine to be plugged in. An enforcement engine is a system that accepts configuration specific to an individual policy area and applies it to the infrastructure thus transforming it into runtime state. In the example of FIG. 7, the enforcement points provided by providers include distributed firewall (DFW) 710, load balancer (LB) 715, distributed network encryption (DNE) 720, public clouds 725, data loss prevention (DLP) 730, anti-virus (AV) 735, L2/L3 (Layer 2/Layer 3) provider 740, etc. Each one of these services can be a native service of the network virtualization platform, a service provided by a third party provider, or a service written by a user (e.g., in a script language).

The service providers register their service capabilities with the policy subsystem. The capabilities are actions, which the providers provide and configurations the providers require for enforcing the actions. The plug-in capability allows new providers to be added without any change in the policy framework.

In some embodiments each provider provides one or more of the followings: (i) capabilities and input rule constructs, (ii) APIs for executing the rules, (iii) identification of policies associated with the rules, (iv) an API for returning state of the policy relative to the provided enforcement, (v) error reporting, and (vi) an APIs for validating the relevant portion of the policy. Several enforcement engines such as distributed firewall provider and L2/L3 provider are described in the following sections.

i. Distributed Firewall

In a distributed firewall, the security policy is defined centrally but the firewall rules are enforces at the individual endpoints such as the hosts and forwarding elements inside a network. Firewall rules that are set in the policy are published down to the firewall management plane desired state using the firewall provider. The published rules have a reference back to the policy that was used to create the rules.

Typically, firewall rule definitions include the following five tuples: source, source port, destination, destination port, and service (or application), in addition to an action value. In some embodiments, the firewall rules include an additional tuple (referred to herein as the AppliedTo tuple). The AppliedTo tuple lists a set of enforcement points (network nodes) at which the firewall rule has to be applied. In some embodiments, the enforcement points can be defined in terms of (1) VNICs, VMs, hosts, or other compute constructs (e.g., compute clusters, datacenters, etc.), (2) network elements, such as managed forwarding elements, a logical forwarding elements, other managed appliances, unmanaged third-party appliances (e.g., third party firewalls), and/or combination of such elements, and/or (3) security groups that are formed by a set of one or more VNICs, VMs, hosts, compute constructs and/or network constructs.

In some embodiments, each host machine in the network includes virtualization software (e.g., a hypervisor) for virtualizing physical resources of the host machine and a host managed forwarding element (MFE) for forwarding network traffic (e.g., data messages) to and from the virtual machines. The host MFE, in some embodiments, operates within the virtualization software. In addition, some host machines include one or more VMs that connect to the host MFE.

In some embodiments, the host MFEs are configured to logically forward data messages according to logical forwarding elements configured by an administrator of the network (e.g., logical switches, logical routers) to implement a logical forwarding element (LFE) of a logical network. In some embodiments, the logical network is an abstract conception of a network generated by an administrator, and the logical network is implemented in a virtualized, distributed manner in a managed physical infrastructure (e.g., in a multi-tenant datacenter). That is, the virtual machines that connect to the LFEs may reside on various different host machines within the infrastructure, and MFEs (e.g., software virtual switches) operating on these host machines implement some or all of the logical forwarding elements (logical switches, logical routers, etc.). In the virtualization field, some refer to software switches as virtual switches as these are software elements. However, in this specification, the software forwarding elements are referred to as MFEs, in order to distinguish them from LFEs, which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

Examples of the supported firewall rules include the followings:

Allow (input params: src, dest, service, applied_to)
Deny (Input params: src, dest, service, applied_to)

In the above rules, src and dest are references to groups, which may already exist or could be defined in the policy.

While the above model helps troubleshoot any issues that may arise by allowing the user to inspect the rules in the firewall management plane tables, the model creates a multi-master issue that needs to be resolved. The multi master issue arises because the user's intent is in two desired states: the policy desired state and the firewall desired state.

Some embodiments keep a clear distinction between the higher-level policy actions and the corresponding rules created on the firewall to help troubleshoot and debug issues that may result during realization. For instance, in some embodiments the firewall desired state generated via the policy is kept read-only and any changes to the relevant rules be allowed only from the policy interface. In some of these embodiments any sections that are not created via the policy are shown in the UI in the form of unmanaged policies in order to provide a complete picture to the end user. The user can use the policy API and/or policy UI to apply firewall rules in order to keep one primary interface for firewall consumption. The policy UI in some embodiments generates a warning if the user attempts to use both interfaces.

The firewall rules are inserted in the firewall configuration based on the precedence of the policies from which they originate. The rules are ordered in the same precedence as that of the policies. Some embodiments allow a user to create firewall sections directly at the firewall level in addition to sections created by the policies. The policy views in the UI in these embodiments indicate that there are rules that are not created via policy API/UI. "Id firewall" is a specialized form of a firewall that is enforced based on user-identity. Workflow for human resources department use case described below shows the high level workflow for the id-based DLP and firewall.

ii. L2/L3

L2/L3 actions involve network connectivity requirements such as creation of networks, configuration of routing, etc. Some embodiments provide a combined L2/L3 provider. The actions registered by the L2/L3 provider allow the user to consume the networking functions in the policy template. The L2/L3 service combines the L2 and L3 features required to define a network and facilities definition of a network topology from the viewpoint of a user.

Example of an action provided by the L2/L3 provider is creation of an MFE or LFE with routing requirements. When defining a network, a user is typically interested in defining entities such as a router network rather than the details of L2 or L3 connections. The L2/L3 service in some embodiments provides actions such as "createRouterNetwork (parameters)" Invocation of this action causes the L2/L3 service to internally (i.e., without any further input from the user) create an LFE, provision a router, associate the router with the LFE, an configure the LFE with the IP addresses provided as the parameters of the "createRouterNetwork" action.

Some embodiments require the following activities to be performed prior to executing the L2/L3 actions via the policy: (i) installation of data path bits required for L2/L3 functionality, (ii) creation of transport zones, (iii) creation of edge clusters, and (iv) creation of any forwarding element profiles that may need to be used. A logical network is what a data center tenant (or end user) defines and perceives as an LFE. The set of host virtualization software (e.g., hypervisors) on which an LFE is available is referred to as a transport zone.

iii. Fetching of Entities Referenced by Policy

Each provider that registers an action that creates an entity has to ensure that the policy instance identification and the policy resource identification persist along with the entity. In some embodiments, all classes that represent such entities implement an interface "PolicyResource" with these properties. Thus, for instance, a class called LogicalSwitch class implements the PolicyResource interface.

The policy instance identification in some embodiments is a UUID and the policy resource identification is the name of the resource as specified in the policy template. The combination of the policy instance identification and the policy resource identification generates a unique identifier to fetch the entity.

Each provider also provides a common service to fetch objects with given policy instance identification and/or policy resource identification. The policy framework in some embodiments generates a unique resource identification for each resource declared in the policy definition. During instantiation, the framework invokes the providers with an "execute" call for each action. The invocation includes the action, resource identification and other details about the resource as needed for the action, and action parameters.

The providers set the policy resource identification and the policy instance identification properties of the newly created entities based on the values received from the framework. Policy framework in some embodiments makes a "compliance" call with the same parameters that were used during the "execute" call. The providers use the resource identification to fetch and check the status of realization of the entities. If a provider's action refers to a resource identification that belongs to a different provider (e.g., the firewall referring to a forwarding element resource), the common service mentioned above is used to fetch the actual entity that is mapped to that resource identification by the provider.

iv. Support for Script Based Providers

The network virtualization platform policy in some embodiments supports providers that are scripts (e.g., Python scripts) that are authored by end users. For instance, this features serves load balancing templates and actions that can be used in policy. Out of the box scripts that represent different typical load balancer configurations are provided, and the user is allowed to take these scripts and modify them as per the requirements specific to the environment.

v. Interactions with Control Plane and Data Plane

Each provider that is plugged in with the policy framework can interact with the control plane as the provider would do without using the policy. The provider identifies the policy that the associated rules have originated from. The control plane reports back status of realization when queried using the policy identifier.

Data plane provides the actual enforcement of the rules and is the last layer of the realization chain. The rules that are pushed down to the data plane from the management plane via the controller are tagged with the policy that generated the rules. The tag is utilized in status reporting and also assists in troubleshooting. The tag also assists in cleanups in case the policies were to be deleted. The controller is an application in the software-defined networking (SDN) that manages flow control to enable intelligent networking. SDN controllers are based on protocols, such as OpenFlow, that allow servers to tell switches where to send packets. In context of network virtualization platform, the controller also performs the roles of the rule dispatcher to the data plane for different services.

vi. Role-Based Access Control (RBAC)

Different embodiments provide different approaches for role-based access control to policy. In some embodiments, the network virtualization platform does not provide granular RBAC. In these embodiments, the network virtualization platform only supports high-level roles of administrator and guest. Higher-level policy consumers such as cloud management platforms or higher-level policy solutions use the administrator role in the network virtualization platform and provide the required roles and permissions as required to the end consumer.

In other embodiments, the network virtualization platform provides granular policy level privileges. For instance, some embodiments provide one or more of the following roles: (i) root role, which can modify policy precedences, (ii) policy administrator, which can add, modify, and delete policies and rules, (iii) policy operator, which can add/modify/delete rules within a policy, and (iv) policy auditor, which can only view privileges. In some embodiments these roles apply at a per policy level (i.e., privileges are provided at object level).

C. Data Model

Figure 8:
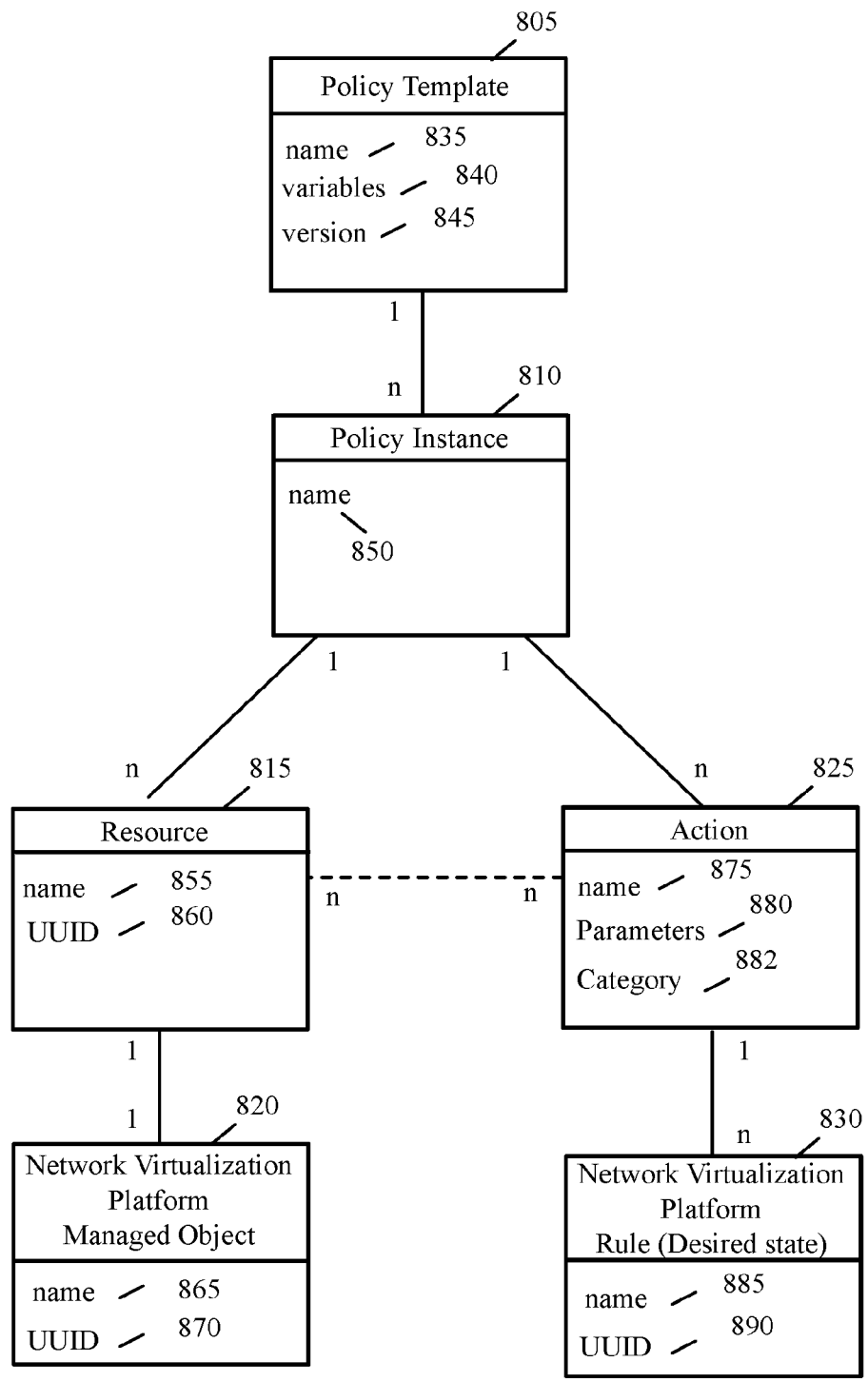
FIG. 8 conceptually illustrates an example of a data model in the network virtualization platform of some embodiments.

FIG. 8 conceptually illustrates an example of a data model in the network virtualization platform of some embodiments. As shown, the data model includes several classes 805-830. Class 805 defines the policy template and includes the template name 835, variables 840, and version 845.

Policy instance class 810 (which inherits from policy template class 705 and defines the policy instances) includes the instance name 850. There is a one-to-many relationship (as shown by 1 and n) between policy template class 805 and policy instance class 810. Resource class 815 (which inherits from policy instance class 810 and policy template class 805) includes the resource name 855, and an optional unique identifier (such as a UUID) 860. There is a one-to-many relationship (as shown by 1 and n) between policy instance class 810 and resource class 815.

Network virtualization platform managed object class 820 (which inherits from resource class 815, policy instance class 810, and policy template class 805) includes name 865 and unique identifier (e.g., UUID) 870. There is a one-to-one relationship (as shown by numbers 1 and 1) between resource class 815 and network virtualization platform managed object class 820.

Action class 825 (which inherits from policy instance class 810 and policy template class 805) includes the action name 875, a set of parameters 880, and a category 882. There is a one-to-many relationship (as shown by 1 and n) between policy instance class 810 and action class 825. Furthermore, there is a many-to-many relationship (as shown by n and n) between policy resource class 815 and action class 825.

Network virtualization platform rule (or desired state) class 830 (which inherits from action class 825, policy instance class 810, and policy template class 805) includes name 885 and an optional unique identifier (e.g., UUID) 890. There is a one-to-many relationship (as shown by 1 and n) between action class 825 and network virtualization platform rule class 830.

II. Use Cases

In the following sections, different aspects of the policy lifecycle are covered by describing several examples. It should be understood that the invention is not limited to these representative use cases.

A. Context Injection and Service Chaining

This use cases is described for a human resources (HR) where all data for all applications belonging to the HR department is scanned for sensitive information. Any data identified to contain sensitive information should be prevented from being sent out to the Internet. One of the advantages of the policy framework of some embodiments is not only to allow consumption of different services provided by network virtualization platform, but also to link different services together to achieve higher-level policy goals that transcend across services.

In the use case for the HR department, multiple service engines need to be chained together to provide the followings: (i) VMs that satisfy the criteria has to be identified, (ii) DLP engine has to identify sensitive data flowing from the identified VMs, and (iii) firewall engine has to disallow the identified data from being forwarded outside of the network.

In other words, the higher-level policy declaration may require invocation of certain services based only on certain conditions. In this instance, the policy requires that certain firewall rules be applied only to those flows that include sensitive data. A similar requirement may be to apply rules to flows that are initiated only by certain users or certain processes. The firewall service (either a distributed firewall provided by the network virtualization platform or a third party partner firewall) has to know which flows are associated with the sensitive data and/or the users referred in the policy. This information would be made available via the context information associated with the packets and/or connections originating from virtual machines. Context in the network virtualization platform is the metadata of entities and packets that is required by enforcement engines to make policy decisions. Context can be network virtualization platform context that is discovered by network virtualization platform, or external context that is supplied by the network virtualization platform partners or compute managers.

Providing context as a part of the flows is achieved in some embodiments through an overlay network protocol. In some embodiments, the MFEs implement an overlay network. An overlay network is a network virtualization technology that achieves multi-tenancy in a computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is an L2 overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks.

As an example, GENEVE provides specification for associating context with packets that flow on the network. The context is provided by a trusted service within the guest VMs or is explicitly applied by network virtualization platform based on its inherent knowledge or knowledge acquired from partner solutions. The context is made available to the MFE on the virtualization software, which in turn performs the tagging of the packet. A tag in some embodiments is user defined metadata on a network virtualization platform resource. A tag is a property in the network virtualization platform data model that is defined by the user.

Figure 9:
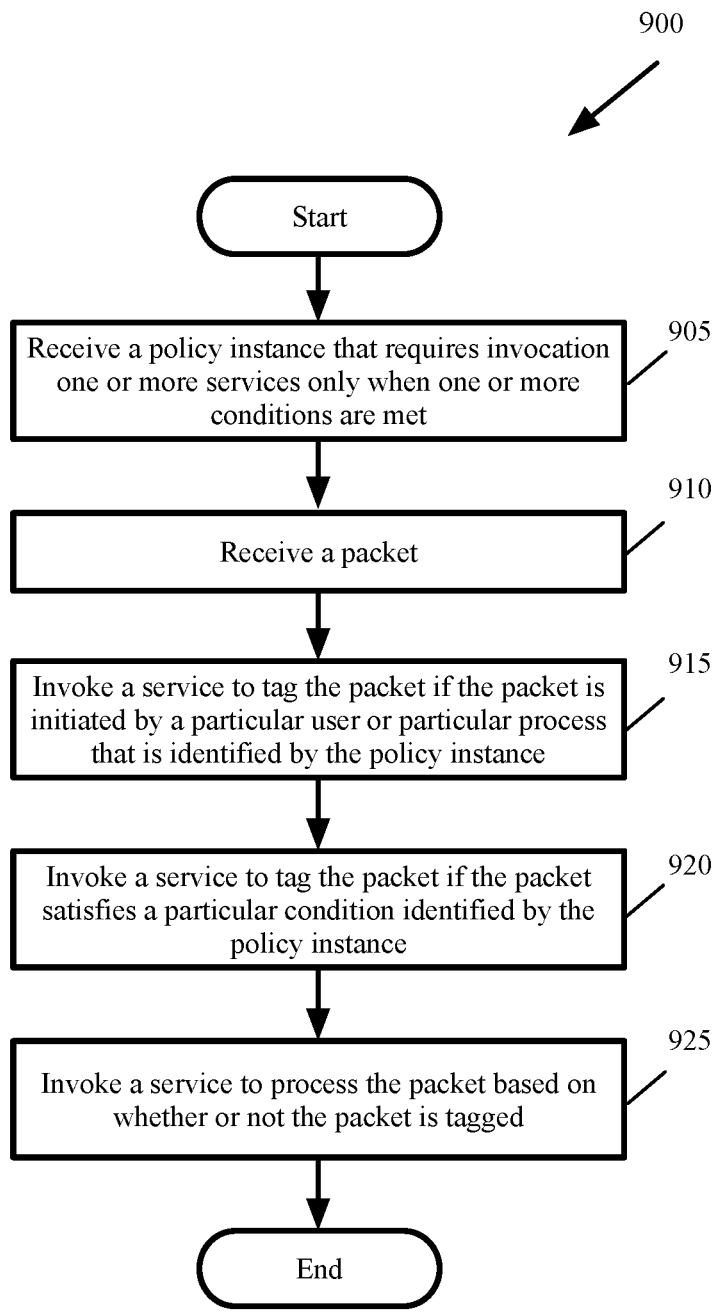
FIG. 9 conceptually illustrates a process for enforcing a policy that requires linking different services together in some embodiments.

FIG. 9 conceptually illustrates a process 900 for enforcing a policy that requires linking different services together in some embodiments. The process is performed by a policy enforcement framework that includes several enforcement points such as PEPs 110-125 shown in FIG. 1. As shown, process 900 receives (at 905) a policy instance that requires invocation of one or more services only when one or more conditions are met. For example, the policy instance may requires packets from HR department with sensitive data not to be sent to external networks. The process then receives (at 910) a packet.

The process then invokes (at 915) a first service to tag the packet if the packet is initiated by a particular user or a particular process that is identified by the policy instance. For instance, the process invokes a GI process to determine whether the packet is initiated by the HR department. If the packet is initiated from the HR department, the GI process tags the packet and sets the packet context to a packet that is initiated by an HR user.

The process then invokes (at 920) a second service to tag the packet if the packet satisfies a particular condition identified by the policy instance. For instance, the process invokes a DLP service to scan the packet and determine whether the packet includes sensitive data. The DLP tags the packet and sets the packet context to "data sensitive" if the packet includes sensitive data.

The process then invokes (at 925) a third service to process the packet based on whether or not the packet is tagged. For instance, the process invokes a firewall service to process the packet based on whether or not (i) the packet is from the HR department and (ii) includes sensitive data. The process then ends. Process 900 invokes different services based on their precedence in the policy instance in order to first invoke the processes whose results are needed by subsequent processes.

Figure 10:
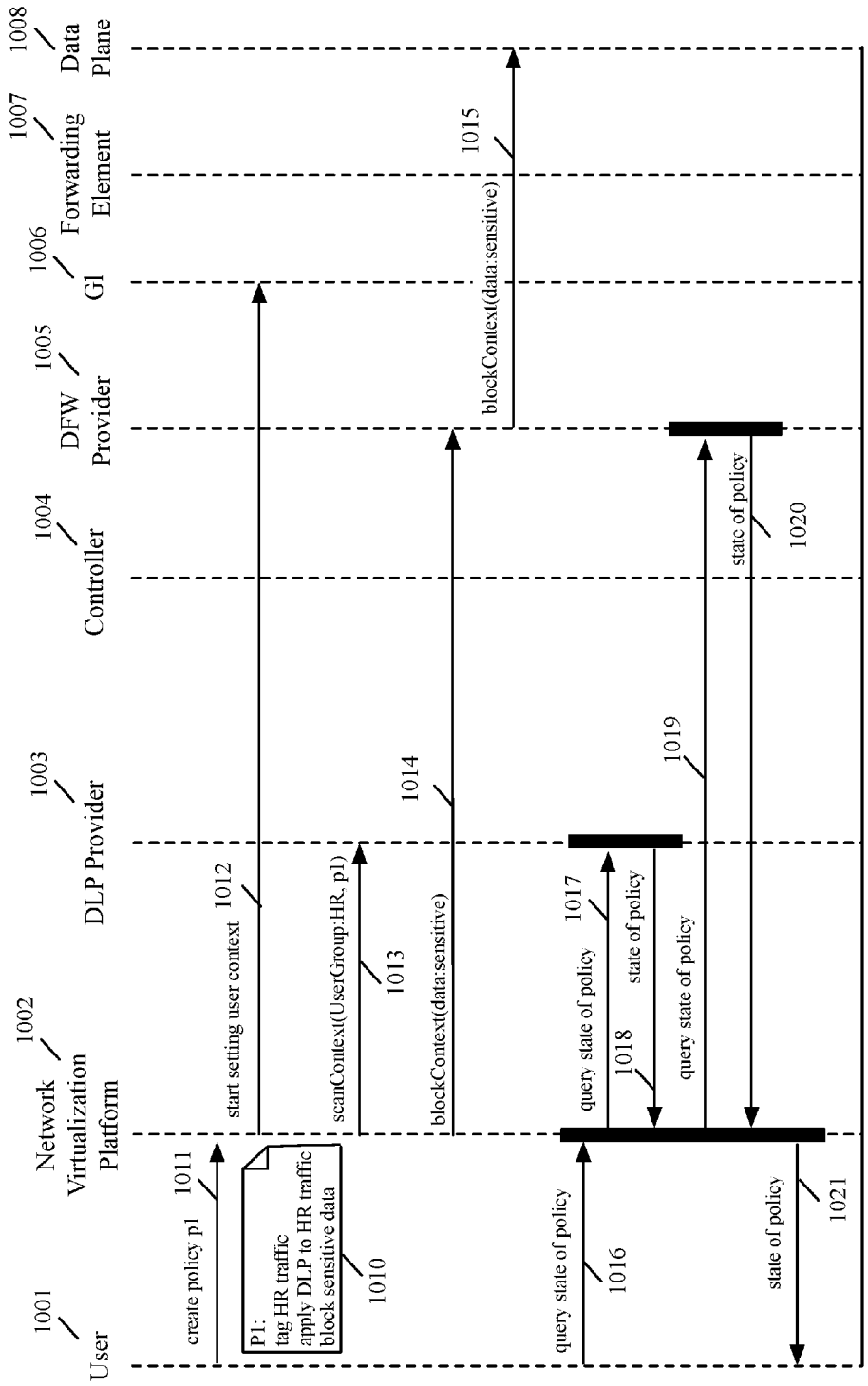
FIG. 10 conceptually illustrates the workflow for accepting the desired state in a human resources department use case in some embodiments.
Figure 11:
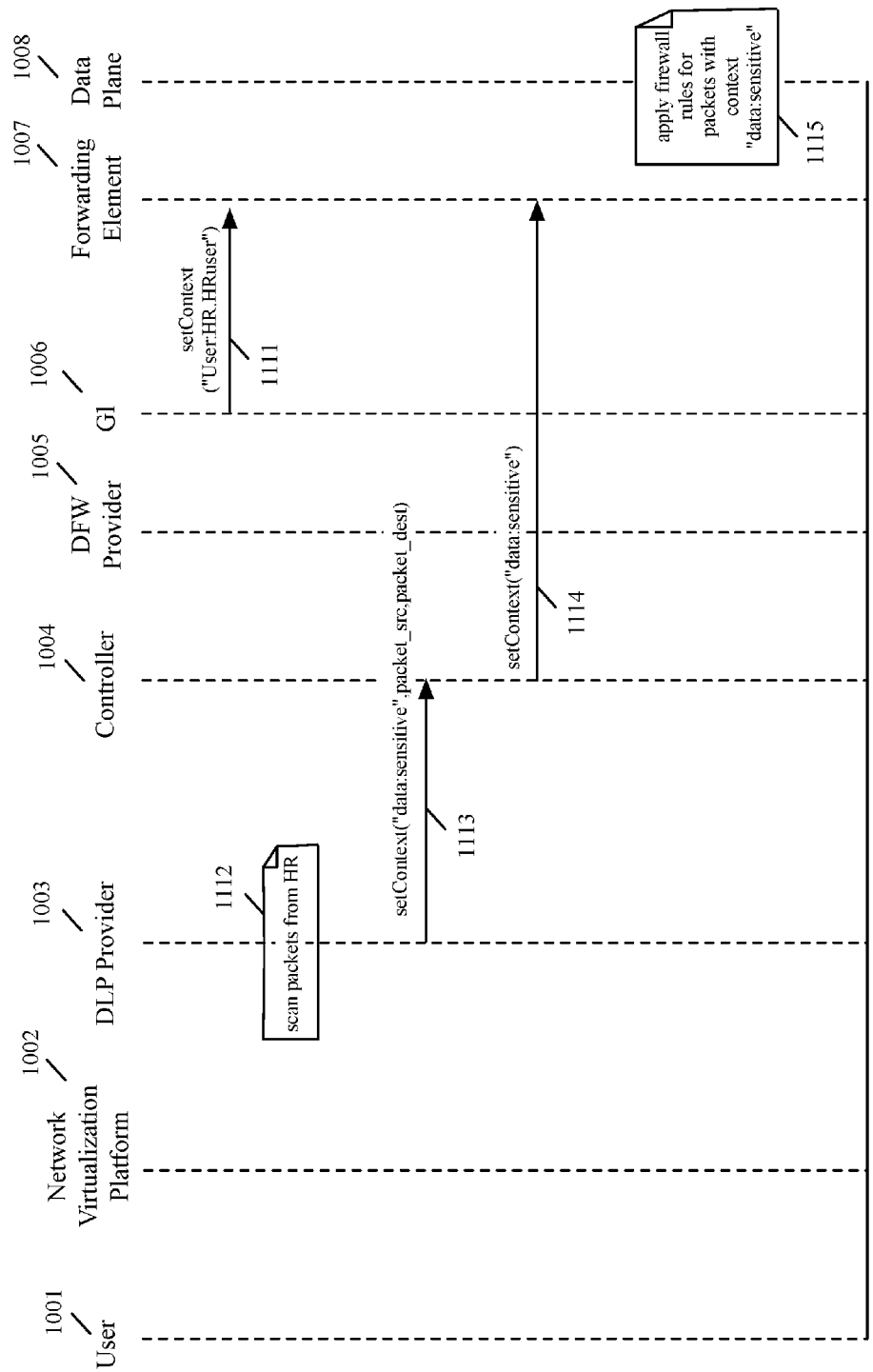
FIG. 11 conceptually illustrates the workflow for handling the traffic generated from the human resources department users in the human resources department use case in some embodiments.

FIG. 10 conceptually illustrates the workflow for accepting the desired state in the HR department use case in some embodiments. FIG. 11 conceptually illustrates the workflow for handling the traffic generated from the HR users in the HR department use case in some embodiments. The figures shows several actors: user 1001, network virtualization platform 1002, DLP provider 1003, controller 1004, DFW provider 1005, Guest Introspection (GI) 1006, forwarding element 1007, and data plane 1008.

As shown, user 1001 creates a policy 1010. The policy, which is called p1, is received by network virtualization platform 1002 (as shown by 1011). Policy P1 in this example includes the followings: (i) tag HR traffic, (ii) apply DLP to HR traffic, and (iii) block sensitive data. For simplicity, the criteria for data to be sensitive is not substantiated in this example.

Network virtualization platform 1002 sends (as shown by 1012) GI 1006 the "start setting user context" message. The message requests the in-guest GI component to start setting the context on the packets. The message provides optimization and prevents every guest from sending the context information is case there is no rule in the policy that consumes that context. Network virtualization platform 1002 also sends (as shown by 1013) DLP provider 1003 the "scanContext (UserGroup:HR, p1)" message to scan context for user group HR according to policy p1. Network virtualization platform 1002 also sends (as shown by 1014) a "blockContext(data:sensitive)" to DFW provider 1005 to block data that is identified as sensitive. The DFW provider 1005 sends (as shown by 1015) a "blockContext(data: sensitive)" to data plane to block data that is identified as sensitive.

In the example of FIG. 10, user 1001 also inquires about the state of the policy by sending a "query state of policy" message (as shown by 1016) to network virtualization platform 1002. Network virtualization platform 1002 sends a "query state of policy" message (as shown by 1017) to DLP provider and receives a "state of policy" response (as shown by 1018) from the DLP provider. Network virtualization platform 1002 also sends a "query state of policy" message (as shown by 1019) to DFW provider and receives a "state of policy" response (as shown by 1020) from the DFW provider. Based on the responses 1018 and 1020, network virtualization platform 1002 sends a "state of policy" response (as shown by 1021) to the user 1001 (e.g., to a UI for display on a display screen of the UI).

FIG. 11 conceptually illustrates the workflow for handling the traffic generated from the HR users for the HR department use case. As shown, GI 1006 sends (as shown by 1111) a "setContext ('User:HR.HRUser')" to forwarding element 1007. DLP provider 1003 scans (as shown by 1112) packets from HR users. As described above by reference to FIG. 10, DLP provider 1003 receives the "scanContext (UserGroup: HR, p1)" message to scan context for user group HR according to policy p1. The DLP provider enforces this policy rule by scanning packets from HR users.

DLP provider also sends (as shown by 1113) a "setContext('data:sensitive', packet_src, packet_dest)" to controller 1004. The controller in this example acts as a dispatcher of information to the data plane. The controller identifies the host virtualization software to which the data needs to be sent. Once the provider has determined that the data is sensitive, the information is sent to the forwarding element that tags this information on the packets. Controller 1004 sends (as shown by 1114) a "setContext('data''sensitive')" message to the forwarding element 1007. The forwarding element takes the context information and applies it to the packets. As shown, data plane 1008 enforces the policy by applying (as shown by 1115) firewall rules for packets with context "data:sensitive").

B. Multi-Tier Application

In this use case, the cloud administrator wants all ports within a 3-tier application (Web, application (App), database (DB)) to get attached to a particular forwarding element "network1". Some of the Web VMs may be hosted on a private cloud. The cloud administrator also wants to apply the following rules: (i) Web VMs should be load balanced, (ii) App VMs on network1 should not be accessible from outside the application, and (iii) Web VMs should be allowed to access App VMs but not DB VMs within the same application. In this use case, there are multiple applications and the cloud administrator wants to use the same template to instantiate multiple instances of such policies. The cloud administrator also wants all the instances to change when any changes are made to the template that was used to create the instance.

In some embodiments, each provider registers the provided actions. For instance the distributed firewall provider registers the actions "allow" and "deny" with the required parameters. Once registered, these actions can be used by the end user in the templates. Once the end user uses the registered actions in the templates, a sequence of actions results in accepting the desired state. The policy is then instantiated. The user intent is first stored in the desired state by each of the underlying facades for each provider. The final realization is done asynchronously based on the desired state of each of the modules and/or providers.

Figure 12:
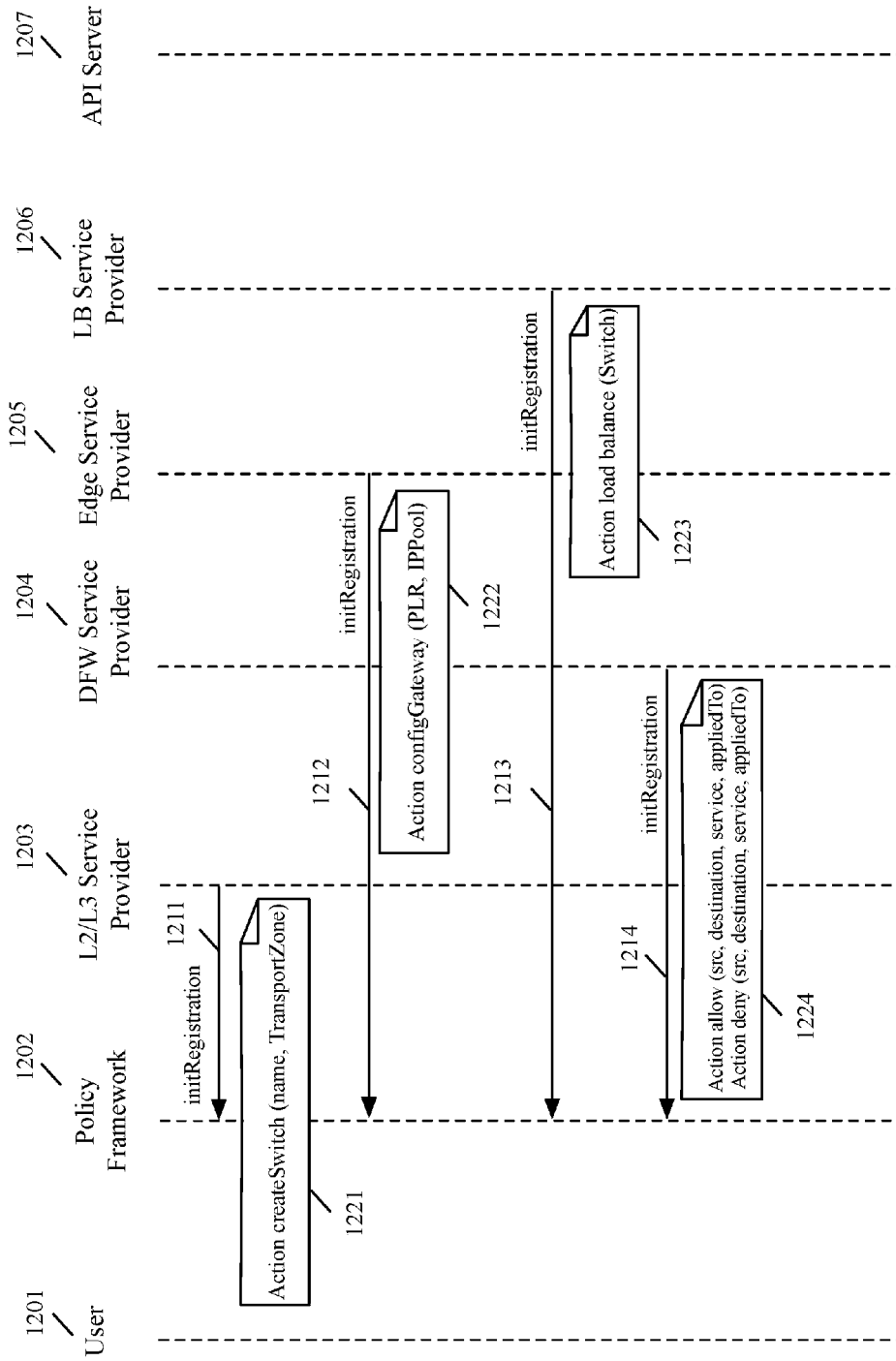
FIG. 12 conceptually illustrates the workflow for service providers to register their capabilities in some embodiments.
Figure 13:
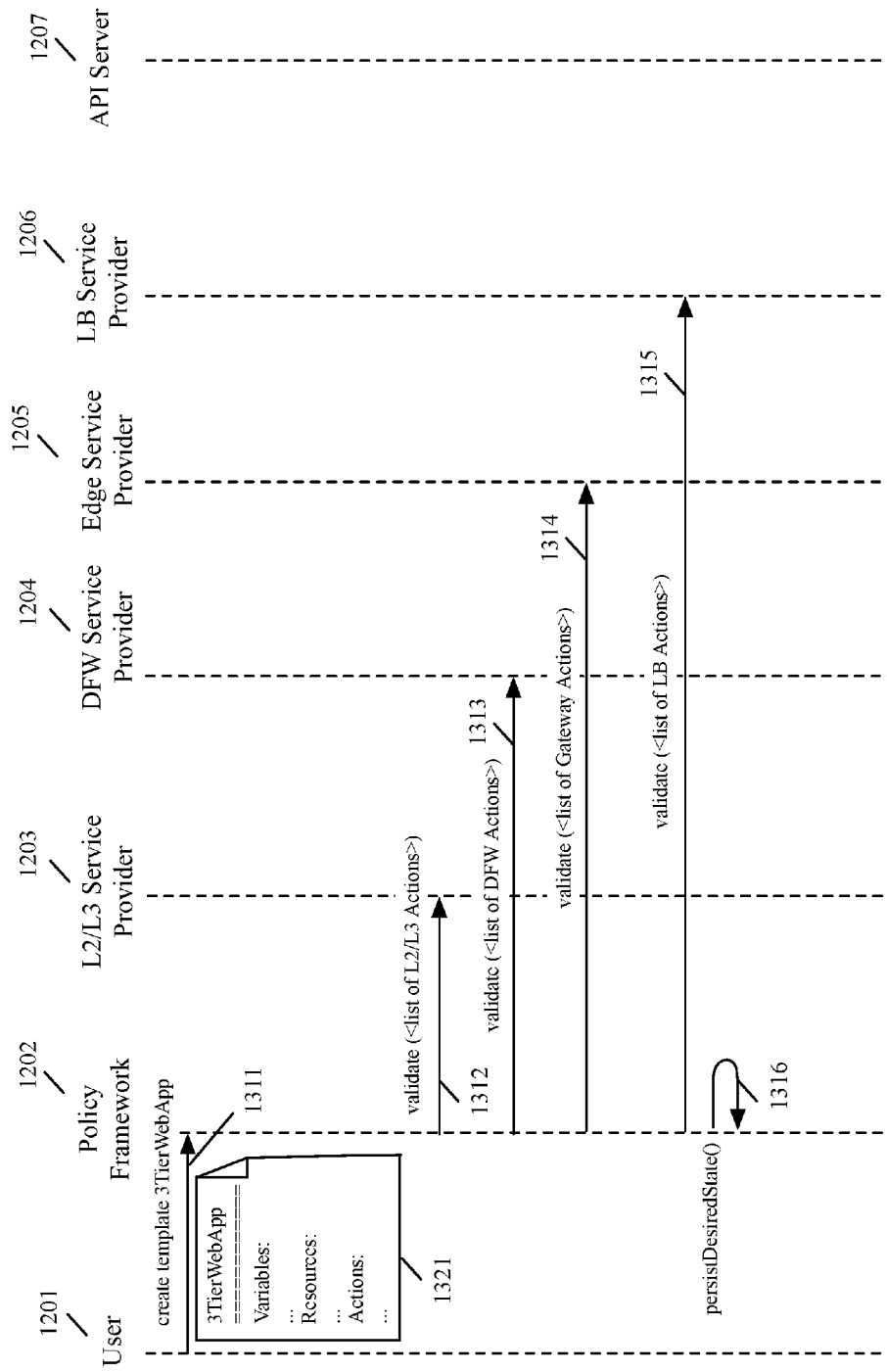
FIG. 13 conceptually illustrates the workflow for accepting desired states in some embodiments.
Figure 14:
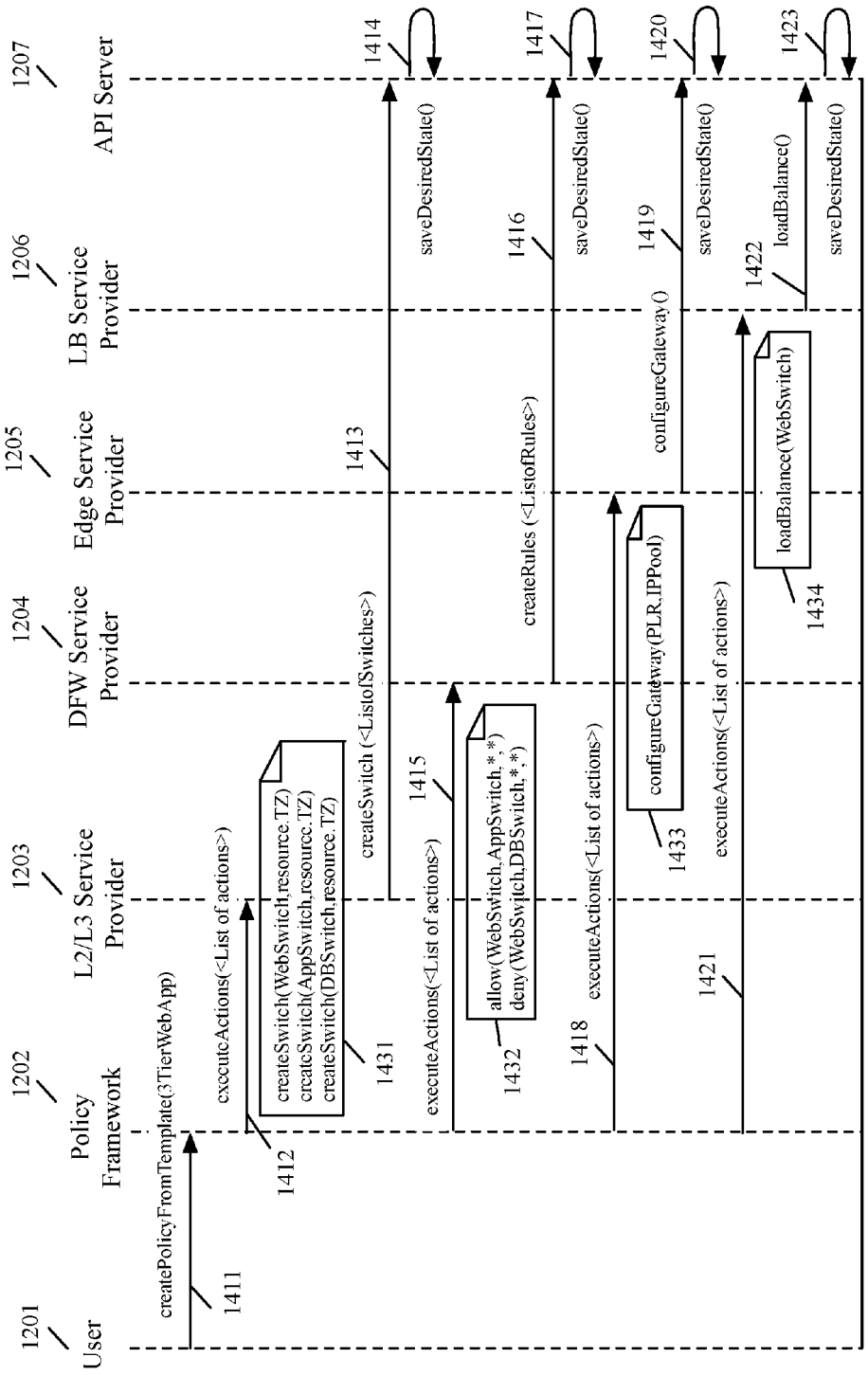
FIG. 14 conceptually illustrates the workflow for instantiation of a policy instance that creates a network topology in some embodiments.

FIG. 12 conceptually illustrates the workflow for service providers to register their capabilities in some embodiments. FIG. 13 conceptually illustrates the workflow for policy validation and accepting the desired states in some embodiments. FIG. 14 conceptually illustrates the workflow for instantiation of a policy instance that creates a network topology in some embodiments. The figures show several actors: user 1201, policy framework 1202, L2/L3 provider 1203, DFW provider 1204, edge service provider 1204, LB provider 1206, and API server 1207.

As shown in FIG. 12, different providers register the capabilities of their services with the policy framework 1202. L2/L3 provider 1203 sends (as shown by 1211) an "initRegistration" message to policy framework 1202 to register an LFE creation action (as shown by 1221). The action includes parameters that specify the name of the LFE and the associated transport zone.

The edge service provider 1205 sends (as shown by 1212) an "initRegistration" message to policy framework 1202 to register a configure gateway action (as shown by 1222). The action includes parameters that specify the packet loss rate (PLR) and the Internet protocol (IP) pool for the gateway. The LB service provider 1206 sends (as shown by 1213) an "initRegistration" message to policy framework 1202 to register a load balance action (as shown by 1223). The action includes a parameter for the identification of a switch for which the load balancing service is to be provided.

The DFW service provider 1204 sends (as shown by 1214) an "initRegistration" message to policy framework 1202 to register allow and dent actions (as shown by 1224). The actions includes a parameters to identify source, destination, service, and AppliedTo information for applying the firewall rules.

As shown in FIG. 13, the user 1201 sends a message (as shown by 1311) to policy framework 1202 to create a template for a 3-tier web application. The template 1321 in this example includes the followings definitions:

3 TierWebApp
Variables:
String TZ_UUID;
Resources:
TransportZone TZ (uuid:% TZ_UUID %)
Switch(WebSwitch, DBSwitch, AppSwitch)
Actions:
createSwitch(WebSwitch, resources.TZ)
createSwitch(AppSwitch, resources.TZ)
createSwitch(DBSwitch, resources.TZ)
LoadBalance(WebSwitch)
allow (WebSwitch,App Switch,*,*)
deny (WebSwitch,DBSwitch,*,*)

The policy framework 1202 then sends messages to different service providers to validate their corresponding actions specified in the policy template 1321. The policy framework 1202 sends a message (as shown by 1312) to L2/L3 service provider 1203 to validate the list of L2/L3 actions specified in the policy template 1321. The policy framework 1202 also sends a message (as shown by 1313) to DFW service provider 1204 to validate the list of DFW actions specified in the policy template 1321. The policy framework 1202 also sends a message (as shown by 1314) to edge service provider 1205 to validate the list of gateway actions specified in the policy template 1321. The policy framework 1202 also sends a message (as shown by 1315) to LB provider 1206 to validate the list of LB actions specified in the policy template 1321. The policy framework then persists (as shown by 1316) the desired state of the policy template. For instance, the policy framework stores the desired state.

As shown in FIG. 14, the user 1201 sends a message (as shown by 1411) to policy framework 1202 to create the network topology for the 3-tier application from the policy template 1321 (shown in FIG. 13). Policy framework sends a message (as shown by 1412) to L2/L3 service provider 1203 to execute a list of actions provided the policy template. In this example, the list of actions includes (as shown by 1431) creation of an LFE for the Web, APP, and DB applications for the transport zone specified in the policy template.

Policy framework also sends a message (as shown by 1413) to API server 1207 to create the LFEs and provides the list of the switches to create. The API server saves (as shown by 1414) the desired state. Policy framework also sends a message (as shown by 1415) to DFW service provider 1204 to execute a list of actions provided the policy template. In this example, the list of actions includes (as shown by 1432) the allow and deny rules specified in the policy template. The DFW servicer provider 1204 sends (as shown by 1416) a message to API server 1207 to create rules and provides the list of the rules (e.g., the allow and deny rules). The API server saves (as shown by 1417) the desired state.

Policy framework also sends a message (as shown by 1418) to edge service provider 1205 to execute a list of actions provided the policy template. In this example, the list of actions includes (as shown by 1433) the configure gateway and the associated parameters PLR and IPPool as specified in the policy template. Edge service provider 1205 sends a message (as shown by 1419) to the API server 1207 to configure the gateway. The API server saves (as shown by 1420) the desired state.

Policy framework also sends a message (as shown by 1421) to LB service provider 1206 to execute a list of actions provided the policy template. In this example, the list of actions includes (as shown by 1434) load balancing for the web LFE. LB service provider 1206 sends a message (as shown by 1422) to the API server 1207 to load balance. The API server saves (as shown by 1423) the desired state.

III. Policy Lifecycle and Enforcement

Figure 15:
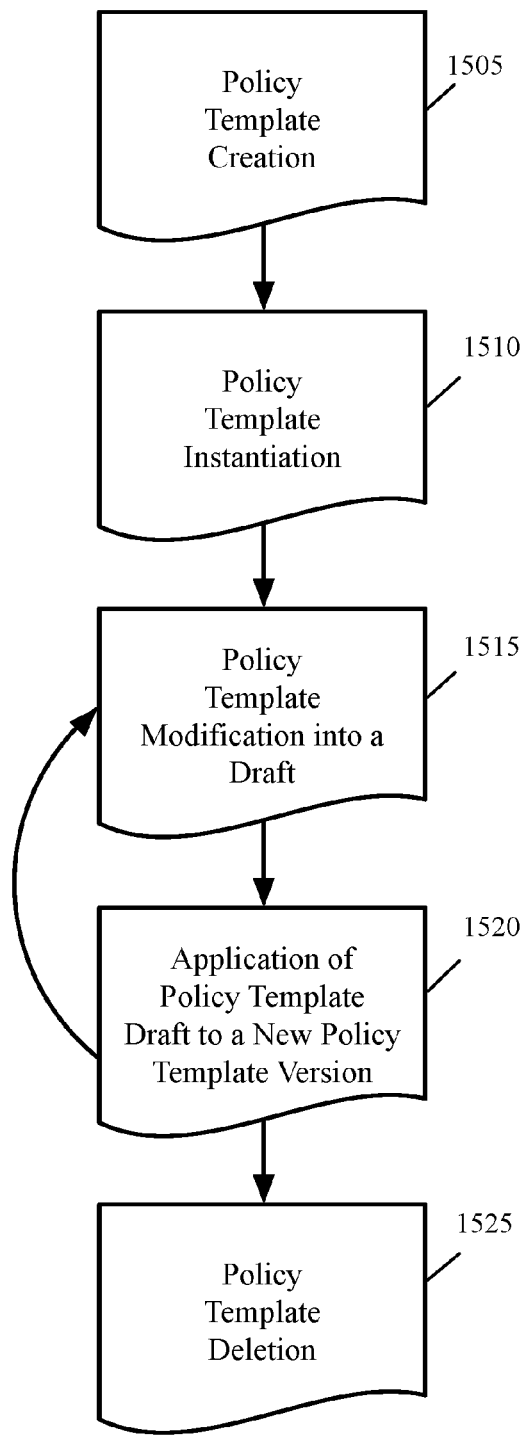
FIG. 15 conceptually illustrates the life cycle of a policy template in some embodiments.

A policy template in some embodiments goes through several stages during its life span. FIG. 15 conceptually illustrates the life cycle of a policy template in some embodiments. In policy template creation stage 1505, the policy template is created. For instance, either a user uses a language such as YAML to define the policy template or an entity such as a compute manager, a cloud portal, or a script uses a JSON based REST API to define the template policy.

Each policy template in some embodiments has a version attribute. The policy template is then instantiated during instantiation stage 1510 into one or more instances. Each policy instance has an owner that instantiates and uses the policy instance. During the life cycle of a policy template, there may be a need to modify the template. As shown by 1515, the policy template is modified into a draft. Once the draft is ready, the draft is applied (as shown by 1520) to the policy template to generate a new version of the template. Whenever a policy template is modified, the policy template version is updated (e.g., incremented).

Every time a policy template is modified, a new version of the template is published and the template becomes available for consumption. For instance, the new version of the template is identified in a policy template listing as the new version of the template. Old template versions are also kept since there might be instances running for the older versions. In some embodiments, the older versions of policy templates are marked as outdated to indicate a newer version of the template exists.

Some embodiments mark the policy instances that are based on an older version of the template as out of sync until the instance owners upgrade the individual instances to conform to the latest template definition. Policy template versions are maintained as long as any instantiated policy of a template is present in the system. A policy template can be deleted (as shown by policy template deletion stage 1525) only if all instances of the policy have been deleted.

In addition to modifying policy templates, policy instances can be modified in some embodiments. A modified policy instance is marked and treated as an instance that is deviated from the base template. A deviated instance remains orphaned (i.e., not associated to the base template) until an administrator initiates a forced sync from the template to the deviated instance. A forced sync operation recreates missing entities (or deletes additional entities) and applies services as defined in the template. A forced sync works effectively similar to a removal and addition of the policy, with the exception that there is no need to delete and then add or modify elements that are not changed. When a policy instance is modified and the base template is also modified, the user has the option to either upgrade to the latest template definition or be as a modified policy instance of a previous version (such instances are marked out of sync).

The network virtualization platform requires a layer that accepts a policy definition (which may be a stripped down version of the original policy defined at the PAP) and converts the policy definition into rules that are specific to each enforcement engine (such as firewall, partners based security, load balancing, etc.) it hosts. This includes provisioning service for virtual networks, configuration of routing/switching/load balancing services, firewall, traffic redirection and guest introspection (GI) services.

Figure 16:
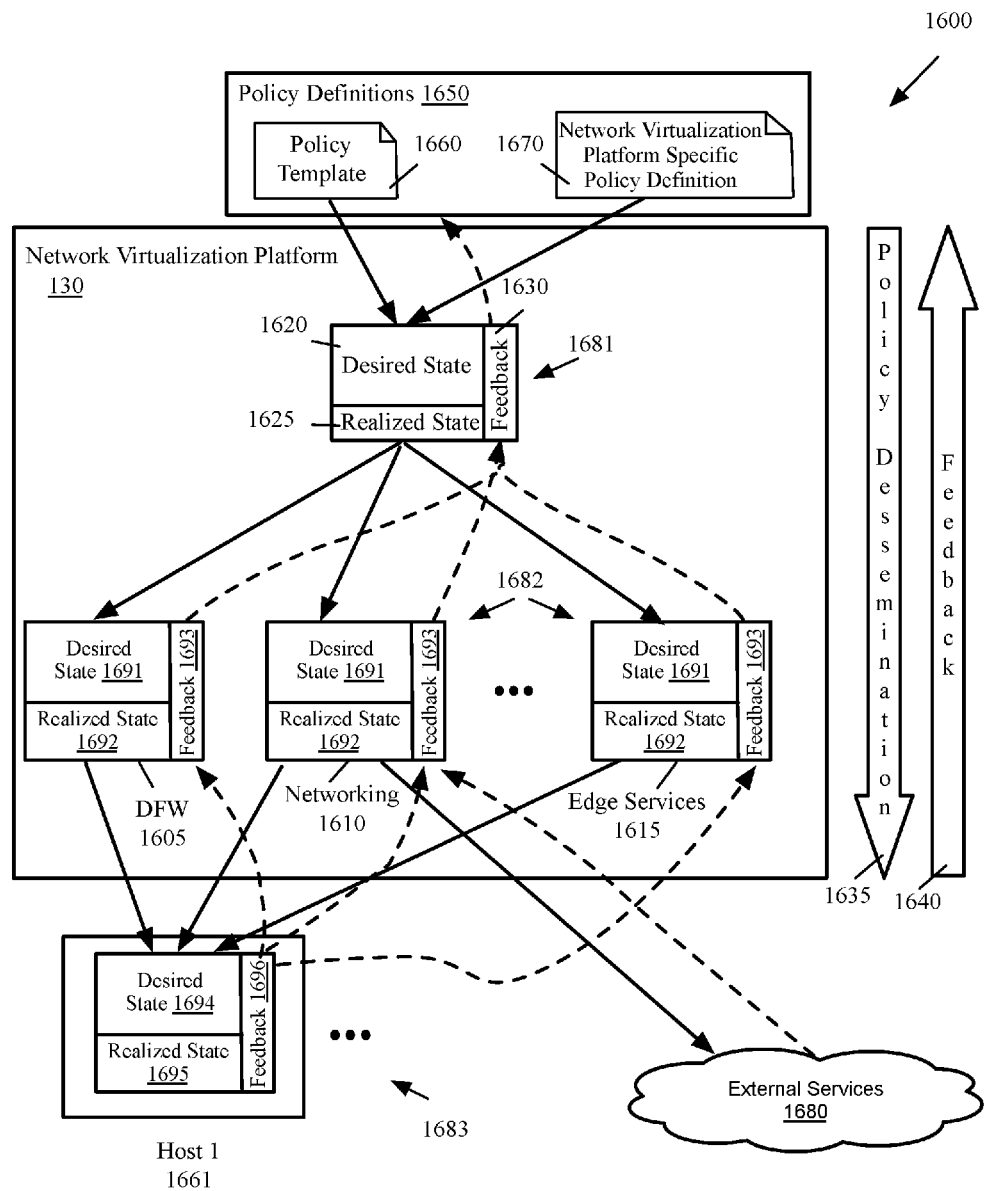
FIG. 16 conceptually illustrates a multi-layer policy framework in some embodiments.

FIG. 16 conceptually illustrates a multi-layer policy framework 1600 in some embodiments. The figure shows translation of desired states of policy into realized state in several different layers (or stages). The figure shows that each of the enforcement engines is expressed in terms of a common subsystem structure, which includes a (a) store of desired state (b) a realization mechanism (c) a feedback mechanism. The figure shows a multi-layer framework for definition, translation, monitoring, and enforcement of policy in a data center.

As conceptually shown in the figure, the policy is disseminated (as shown by 1635) to enforcement points 1605-1615 and feedback is received (as shown by 1640) from the enforcement points. The enforcement points in this example are distributed firewall 1605, networking services 1610 (e.g., L2/L3 services), edge services 1615 (e.g., load balancing), and other data center services such as security services, encryption services, etc. (not shown).

The management plane in some embodiments provides a notion of grouping of elements on which the policy is applied. The policy itself is a combination of the grouping expression(s) and the set of policy controls (or rules) that are associated with that group(s). While the end user deals with these concepts, the underlying enforcement engines are not concerned about the policy construct or the high level requirements or the grammar in which requirements are expressed.

The enforcement engines in some embodiments only deal with the elements on which the enforcement can be applied and the rules specific to each particular enforcement engine. This entails translation of the desired state (the policy construct) into realized state (elements and rules understood by enforcement engines). Each enforcement engine further accepts data provided to it as the desired state and realizes it in the form of elements and rules that are understood by the next level (e.g., by a controller at the next level). Any error or success status is made available in the form of feedback that is provided up to the layer that pushed down the desired state.

As shown, policy definitions 1650 include user-defined policy template 1660 and network virtualization platform specific policy definition 1670. At the highest layer, the multi-layer policy framework includes a layer 1681 in the network virtualization platform 130 that accepts policy definitions 1660-1670 as desired state 1620, converts the policy definition into a set of rules as desired state 1625. For instance, layer 1681 uses an environment profile to determine values to assign to variables used in definition of resources and actions in the policy template 1660. Layer 1681 also instantiates the policy into different policy instance (e.g., for consumption by different enforcement points in different hosts).

Each intermediate layer 1682 (only one layer is shown for simplicity) includes one or more enforcement subsystem 1605-1615. Each enforcement subsystem includes three primary areas: (a) desired state 1691 that accepts the user's intent and cannot be lost by the system, (b) realized state 1692, which is output of the processing of the desired state that is performed asynchronously, and (c) feedback 1693 such as success or failure of the realization process that needs to be provided to the layer above. Some embodiments provide a generic construct that accepts desired state 1691, outputs realized state 1692, and provides feedback 1693.

The user defines the policy template 1650 (e.g., for DFW and/or load balancer) without the knowledge of how the DFW implements the policy (e.g., by using the AppliedTo tuple) or the knowledge of how the load balancer distributes the load. The policy template is sent as a "desired state" to the top layer 1681, which translates it to a desired state by applying values to variable and instantiating different instances of the policy. Each policy instance is sent to one or more intermediate layers 1682 of the multi-layer policy enforcement framework.

Each enforcement subsystem 1605-1610 typically includes a controller and an agent. The controller (which is e.g., a part of the network virtualization platform 130) receives requests for service as well as the identification of a set of actions to be performed on a set of resources. The agent resides in the host (e.g., as a plug-in) where the rules are enforced and uses different functions provided by the host in order to enforce the rules. For instance, the DFW includes a controller that receives requests to allow or deny forwarding of packets from a source or a destination. The DFW also includes an agent (not shown) in each host 1661 that receives specific firewall rules and enforces the rules using different functions provided by the host (e.g., uses function calls at a port of a forwarding element in the host) in order to apply firewall rules to the incoming packet traffic.

The controllers of the enforcement subsystems 1605-1615 at the intermediate layers receive a "desired state" 1691 and convert it to a "realized state" 1692. For instance, the top layer 1681 receives the policy definitions 1650 as the "desired state" 1620 and creates a "realized state" 1625 by using the environment profile and populating variables used in the policy template with specific values. The relevant portions of this "realized state" 1625 are pushed down to DFW, load balancer, etc., as the "desired state" 1691 at those intermediate layers 1682. For instance, the DFW receives the "desired state" and creates firewall rules that include 5-tuple plus AppliedTo as the "realized state." At the lowest layer 1622 of the multi-layer framework 1600, the firewall agent in the virtualization software (e.g., a hypervisor) of a host 1661 receives DFW rules as "desired state," 1694, identifies the enforcement points, sends the rules without the AppliedTo tuple to the enforcement points as the "realized state" 1695.

Figure 17:
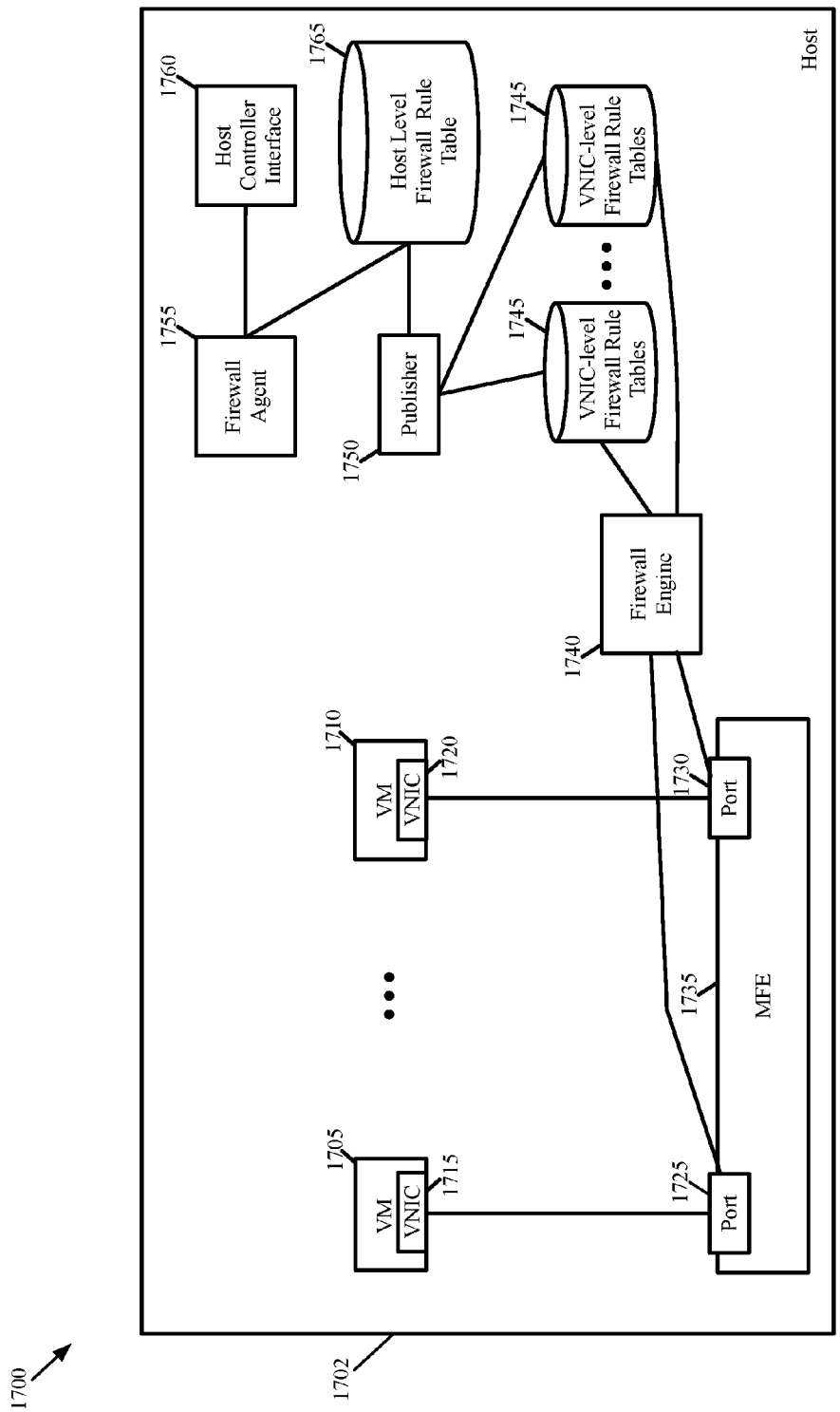
FIG. 17 conceptually illustrates the firewall enforcement architecture of a multi-VM host of some embodiments.

FIG. 17 conceptually illustrates the firewall enforcement architecture 1700 of a multi-VM host 1702 of some embodiments. Other enforcement subsystems such as load balancer, security subsystem, encryption services, etc., utilize a similar architecture in a host to enforce their rules. The host receives AppliedTo firewall rules and based on these rules, specifies multiple virtual network interface card-level (VNIC-level) firewall rule data storages, which it then uses to perform VNIC-level firewall operations on packets sent by, and received for, each VM.

As shown in FIG. 17, the virtualization architecture 1700 includes (1) multiple VMs 1705 and 1710, (2) a VNIC 1715 or 1720 for each VM, (3) a software switch 1735, (4) a port 1725 or 1730 for each VNIC, (5) a firewall engine 1740, (6) VNIC-level firewall rules 1745, (7) a firewall rule publisher 1750, (8) a firewall agent 1755, (9) a host-level firewall rule table 1765, and (1) a host-controller interface 1760.

In some embodiments, the VMs execute on top of the virtualization software (not shown) that is executing on the host. FIG. 17 illustrates just two VMs 1705 and 1710, but a larger number of VMs execute on the host 1702 in some cases. Each VM may belong to one tenant or to multiple tenants when the host operates in a multi-tenant environment.

Each VM includes a VNIC in some embodiments. For instance, VM 1705 includes VNIC 1715 while VM 1710 includes VNIC 1720. Each VNIC of the VM is responsible for exchanging packets between the VM and the software switch. As further described below, each VNIC connects to a particular port of the MFE 1735, which connects to a physical NIC (not shown) of the host. In some embodiments, the VNICs are software abstractions of a physical NIC that are implemented by the virtualization software.

In some embodiments, the MFE maintains a single port for each VNIC of each VM. For instance, for VNICs 1715 and 1720, the MFE 1735 includes ports 1725 and 1730. The MFE 1035 performs packet-processing operations to forward packets that it receives on one of its ports to another one of its ports. For example, in some embodiments, the MFE uses data in the packet (e.g., data in the packet header) to match a packet to flow based rules, and upon finding a match, performs the action specified by the matching rule. The MFE 1735 connects to a physical NIC (through a NIC driver (not shown)) to send outgoing packets and to receive incoming packets. In some embodiments, the MFE 1735 is defined to include a port (not shown) that connects to the physical NIC's driver to send and receive packets to and from the NIC.

Also, in some embodiments, the MFE of one host can form multiple logical switches with MFEs of other hosts, with each MFE serving a conceptual switch that services a logical network. In other words, different MFEs can be defined to specify different logical networks for different users, and each logical switch can be defined by multiple MFEs on multiple hosts. VXLAN, GENEVE, or NVGRE provide one manner for creating such logical switches.

In some embodiments, the ports of the MFE 1735 include one or more function calls to one or more modules that implement special input/output operations on incoming and outgoing packets that are received at the ports. One of these function calls is to the firewall engine 1740, which performs in some embodiments firewall operations on incoming and/or outgoing packets (i.e., on packets that are received by the host for one of the VMs or on packets that are sent by one of the VMs). Other examples of such I/O operations include load balancing, encryption, ARP broadcast suppression operations, DHCP broadcast suppression operations, etc. These other I/O operations can be similarly implemented in some embodiments of the invention. By implementing a stack of such function calls, the ports can implement a chain of I/O operations on incoming and/or outgoing packets in some embodiments. Also, in some embodiments, other modules in the data path (such as the VNICs, etc.) implement the I/O function call operations (such as the firewall function calls).

As mentioned above, the firewall engine 1740 can be called (e.g., by a port 1725 or 1730 of the MFE 1735) for incoming or outgoing packets to check whether such packets should be delivered to a VM or sent from a VM based on VNIC-level firewall rules that are stored for the VM's VNIC in the VNIC-level firewall data storage 1045. In some embodiments, the firewall engine 1740 can be called by the port that connects to the physical NIC's driver (e.g., for incoming packets).

The firewall engine tries to match the received packets' identifiers (e.g., a five-tuple identifiers of source address, destination address, source port, destination port, and protocol extracted from the packet header) with the associated identifiers (e.g., five-tuple identifiers) of the firewall rules stored in the VNIC data storage 1045 of the VNIC that is the destination of an incoming packet or the source of an outgoing packet. In other words, to match a rule with a packet, the firewall engine identifies n-data tuples for a packet (e.g., extracts these tuples from the packet's header) and compares the identified tuples with the n-data tuples of each rule. These firewall rules in some embodiments are the realized states 1695 that are generated and stored as desired state 1695 at the lowest layer 1683 of the multi-layer policy framework 1600 of FIG. 16.

The firewall rule publisher 1750 populates and updates the VNIC-level firewall rule data storages 1745 based on the host-level AppliedTo firewall rules that are stored in the host-level firewall rule data storage 1765. In some embodiments, the publisher examines the AppliedTo identifier of each new firewall rule or updated firewall rule in the host-level firewall data storage 1765 to determine whether the rule pertains to a VNIC of one of the VMs currently instantiated on the host. Whenever the publisher 1750 identifies a new or updated rule that pertains to one such VNIC, the publisher pushes the new rule or updated rule to the VNIC's firewall rule table 1745. In pushing this rule to the VNIC's firewall rule table, the publishing engine removes the AppliedTo identifier from the firewall rule before storing the firewall rule in the VNIC's firewall rule table. The firewall agent 1755 populates and updates the host-level firewall rule data storage 1765 based on host-level AppliedTo firewall rules that it receives from the controller (e.g., the controller of the DFW subsystem 1605 in FIG. 16) through the host-controller interface 1760 and the network (not shown).

Referring back to FIG. 16, each layer also has a feedback mechanism 1630, 1693, and 1696 that can be queried from the higher level. The feedbacks from lower layers are propagated (as shown by the dashed line) to higher layers and are presented to the user at the user interface (not shown). The feedback mechanism provides the important feature of providing error and status to the user without directly dealing with the lower level services.

Service providers provide functionality to monitor the services and resources deployed by them. A recurrent task would query each provider for the state of all the resources and services the provider has deployed. The providers compare the intent as specified in the policy with the deployed resources and services. The providers can make use of the policy instance identification and the resource identification to identify the elements bound to the policy instance. Some embodiments provide a generic service that maintains transaction logs populated by providers during instantiation. This transaction log is then used both during monitoring and cleanup as initiated by the policy framework.

Policy users should be able to look at a policy and be able to find out the state of the realization of the policy at any given point. Some embodiments provide a policy realization engine that allows the state of the policy to be queried, which in turn queries the state of the all underlying services and consolidates the output into a single unit. For instance, each layer of the policy dissemination chain implements a PolicyStateProvider as follows:

interface PolicyStateProvider {
List<PolicyStateProvider> getChildren( );
PolicyState getState( );
}
interface PolicyState {
String getModule( );
State getState( );
List<PolicyState> getChildren( );
}

In the above example, the top level PolicyStateProvider is at the Policy framework level, and PolicySateProviders at the vertical provider level are its children. Each Vertical PolicyStateProvider may itself have other child PolicyStateProviders. Invocation of the getState( ) API at the policy level recursively calls into the getState( ) API for each of the children until a leaf PolicyStateProvider provides the state at the end of the chain. The states are, therefore, collected together at each parent PolicyStateProvider. The PolicyStateProvider at the policy level (topmost) includes the states from all the verticals and can consolidate them based on the green/red (or pass/failed) state.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
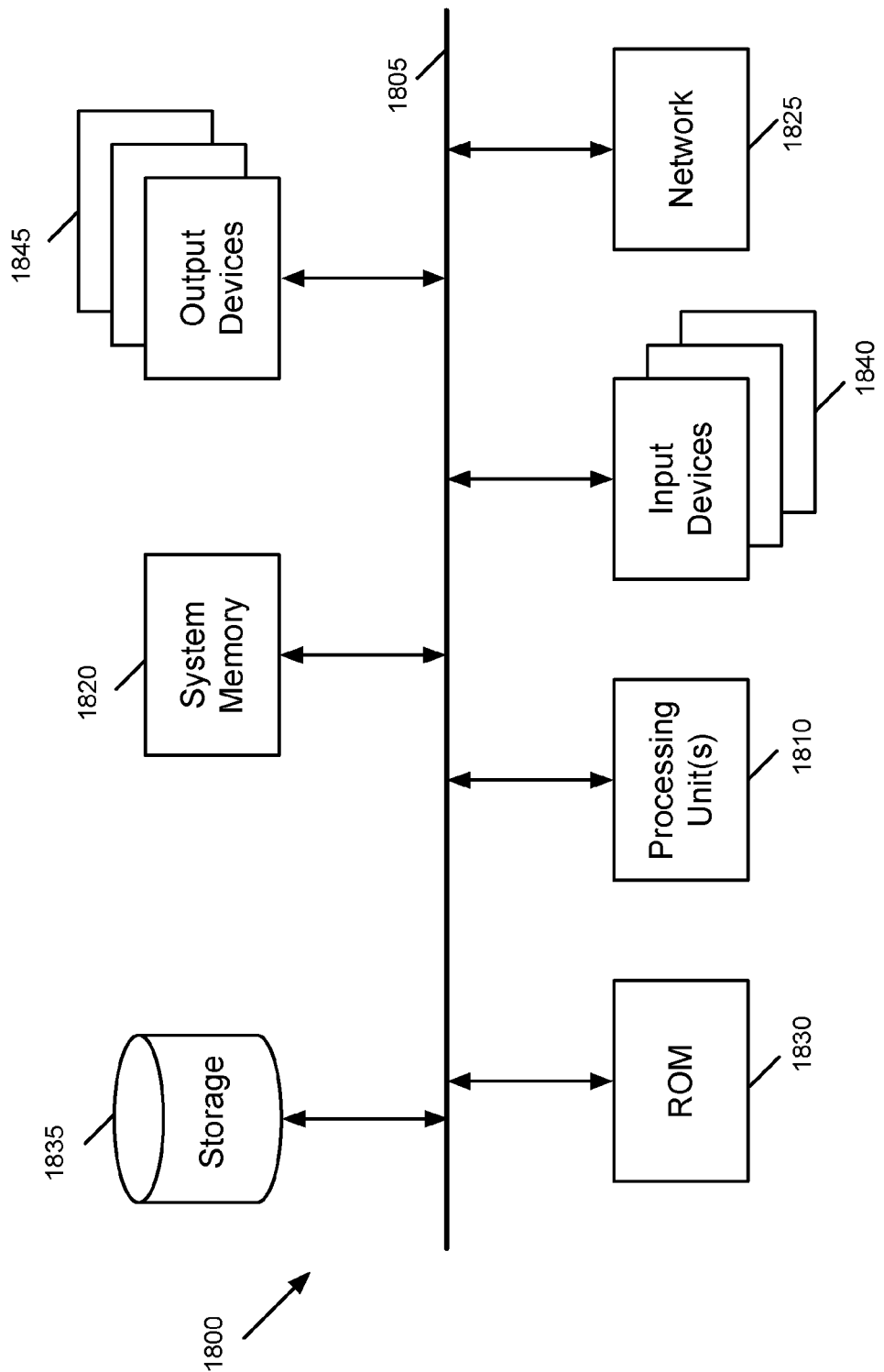
FIG. 18 conceptually illustrates an electronic system with which some embodiments of the invention are implemented.

FIG. 18 conceptually illustrates an electronic system 1800 with which some embodiments of the invention are implemented. The electronic system 1800 can be used to execute any of the control, virtualization, or operating system applications described above. The electronic system 1800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1800 includes a bus 1805, processing unit(s) 1810, a system memory 1820, a read-only memory (ROM) 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1820, and the permanent storage device 1835.

From these various memory units, the processing unit(s) 1810 retrieve instructions to execute and data to process in order to execute the processes of the invention. The processing unit(s) may be a single processor or a multi-core processor in different embodiments.

The read-only-memory 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash drive, etc.) as the permanent storage device. Like the permanent storage device 1835, the system memory 1820 is a read-and-write memory device. However, unlike storage device 1835, the system memory is a volatile read-and-write memory, such as random access memory. The system memory stores some of the instructions and data that the processor needs at runtime. In some embodiments, the invention's processes are stored in the system memory 1820, the permanent storage device 1835, and/or the read-only memory 1830. From these various memory units, the processing unit(s) 1810 retrieve instructions to execute and data to process in order to execute the processes of some embodiments.

The bus 1805 also connects to the input and output devices 1840 and 1845. The input devices enable the user to communicate information and select commands to the electronic system. The input devices 1840 include alphanumeric keyboards and pointing devices (also called "cursor control devices"). The output devices 1845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 18, bus 1805 also couples electronic system 1800 to a network 1825 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 3-6, and 9-14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include VMs. However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of monitoring and enforcing of policy for a network virtualization platform of a data center by using a multi-layer policy enforcement framework, the method comprising:
    at a top layer of the multi-layer policy enforcement framework, receiving a definition of a policy template for a set of data center resources as a desired state of the policy;
    at the top layer of the multi-layer policy enforcement framework, instantiating a set of policy instances from the policy template as desired states of the policy at the top layer;
    sending the policy instances from the top layer to a set of intermediate layers of the multi-layer policy enforcement framework as desired states at the intermediate layers;
    at each particular intermediate layer of the policy enforcement framework, (i) receiving, from a higher layer, a policy instance as a desired state of the policy at the intermediate layer, (ii) receiving a realized state of the policy at the particular intermediate state from a set of policy enforcement controllers, the realized state generated by the set of controllers based on said desired state received at the intermediate layer, the realized state at the particular intermediate state comprising a set of rules generated at the particular intermediate layer by the set of controllers, and (iii) sending at least a portion of the generated realized state to a next lower state as a desired state; and
    at a lowest layer of the multi-layer policy enforcement framework, (i) receiving, from a higher layer, a policy instance as a desired state of the policy at the lowest layer, (ii) receiving a realized state of the policy at the lowest layer from a set of policy enforcement agents, the realized state generated at the lowest layer by the set of agents based on the desired state at the lowest layer, the realized state at the lowest layer comprising a set of rules used to enforce the policy, and (iii) enforcing the set of rules of the realized state at the lowest layer.

2. The method of claim 1 further comprising:
    at the lowest layer and each of the intermediate layers of the multi-layer policy enforcement framework, sending a status feedback to a next higher layer; and
    at each intermediate layer of the multi-layer policy enforcement framework, propagating the status feedback to a next higher layer.

3. The method of claim 2 further comprising displaying the status feedback received from each layer of the multi-layer policy enforcement framework at a user interface of the policy enforcement framework.

4. The method of claim 2, wherein sending the status feedback at each layer is in response to a query received from a user interface of the policy enforcement framework.

5. The method of claim 1, wherein the set of policy enforcement controllers comprise controllers for one or more of a firewall service, a load balancing service, a networking service, an encryption service, a security service, and an edge service.

6. The method of claim 1, wherein the multi-layer policy enforcement framework is configured on a host machine that comprises a managed forwarding element (MFE) comprising a set of ports, wherein the set of rules of the realized state at the lowest layer is enforced by a set of function calls at a port of the MFE in order to enforce the policy on a set of packets received at the port of MFE.

7. The method of claim 1, wherein the policy template comprises a definition of a set of variables, each variable defining an attribute of an action to be applied to a data center resource identified in the policy.

8. The method of claim 7 further comprising providing a value for each variable in the policy template using an environment profile of each policy instance when instantiating the set of policy instances.

9. The method of claim 1, wherein enforcing the set of rules of the realized state at the lowest layer comprises:
    identifying a set of policy enforcement points at the lowest layer;
    sending the set of rules used to enforce the policy to the enforcement points; and
    enforcing the policy at the enforcement points using the rules.

10. A system for monitoring and enforcing of policy for a network virtualization platform of a data center by using a multi-layer policy enforcement framework, the system comprising:
    a set of policy enforcement controller servers;
    a set of physical host machines;
    a set of policy enforcement agents installed at each physical host machine; and
    a multi-layer network virtualization platform configured to:
        receive, at a top layer of the multi-layer network virtualization platform, a definition of a policy template for a set of data center resources as a desired state of the policy;
        instantiate, at the top layer of the multi-layer network virtualization platform, a set of policy instances from the policy template as desired states of the policy at the top layer;
        send the policy instances from the top layer to a set of intermediate layers of the multi-layer network virtualization platform as desired states at the intermediate layers;
        at each particular intermediate layer of the network virtualization platform, (i) receive, from a higher layer, a policy instance as a desired state of the policy at the intermediate layer, (ii) receive a realized state of the policy at the particular intermediate state from the set of policy enforcement controllers, the realized state generated by the set of controllers based on said desired state received at the intermediate layer, the realized state at the particular intermediate state comprising a set of rules generated at the particular intermediate layer by the set of controllers, and (iii) send at least a portion of the generated realized state to a next lower state as a desired state; and
        at a lowest layer of the multi-layer network virtualization platform, (i) receive, from a higher layer, a policy instance as a desired state of the policy at the lowest layer, (ii) receive a realized state of the policy at the lowest layer from the set of policy enforcement agents, the realized state generated at the lowest layer by the set of agents based on the desired state at the lowest layer, the realized state at the lowest layer comprising a set of rules used to enforce the policy, and (iii) enforce the set of rules of the desired state at the lowest layer.

11. The system of claim 10, the multi-layer network virtualization platform further configured to:

at the lowest layer and each of the intermediate layers of the multi-layer network virtualization platform, send a status feedback to a next higher layer; and at each intermediate layer of the multi-layer network virtualization platform, propagate the status feedback to a next higher layer.

12. The system of claim 11 further comprising a user interface, the multi-layer network virtualization platform further configured to display the status feedback received from each layer of the multi-layer network virtualization platform at the user interface.

13. The system of claim 10 further comprising a user interface, wherein sending the status feedback at each layer is in response to a query received from the user interface.

14. The system of claim 10, wherein the set of policy enforcement controllers comprise controllers for one or more of a firewall service, a load balancing service, a networking service, an encryption service, a security service, and an edge service.

15. The system of claim 10, wherein each physical host machine comprises a managed forwarding element (MFE) comprising a set of ports, wherein the set of rules of the realized state at the lowest layer is enforced by a set of function calls at a port of the MFE in order to enforce the policy on a set of packets received at the port of MFE.

16. The system of claim 10, wherein the policy template comprises a definition of a set of variables, each variable defining an attribute of an action to be applied to a data center resource identified in the policy.

17. The system of claim 16, the multi-layer network virtualization platform further configured to provide a value for each variable in the policy template using an environment profile of each policy instance when instantiating the set of policy instances.

18. The system of claim 10, wherein enforcing the set of rules of the realized state at the lowest layer comprises:

identifying a set of policy enforcement points at the lowest layer;

sending the set of rules used to enforce the policy to the enforcement points; and enforcing the policy at the enforcement points using the rules.

* * * * *